(12) United States Patent  
Sieler et al.

(10) Patent No.: US 9,247,222 B2  
(45) Date of Patent: Jan. 26, 2016

(54) PROJECTION DISPLAY AND METHOD FOR DISPLAYING AN OVERALL IMAGE FOR PROJECTION FREE-FORM SURFACES OR TILTED PROJECTION SURFACES

(71) Applicant: FRAUNHOFER-GESELLSCHAFT ZUR FOERDERUNG DER ANGEWANDTEN FORSCHUNG E.V., Munich (DE)

(72) Inventors: Marcel Sieler, Jena (DE); Peter Schreiber, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 35 days.

(21) Appl. No.: 14/083,399

(22) Filed: Nov. 18, 2013

(65) Prior Publication Data

US 2014/0146290 A1 May 29, 2014

Related U.S. Application Data

(63) Continuation of application No. PCT/EP2012/058669, filed on May 10, 2012.

(30) Foreign Application Priority Data

May 18, 2011 (DE) .......................... 10 2011 076 083

(51) Int. Cl.  
*G03B 21/26* (2006.01)  
*H04N 9/31* (2006.01)  
(Continued)

(52) U.S. Cl.  
CPC ............ *H04N 9/3197* (2013.01); *G03B 21/001* (2013.01); *G03B 21/005* (2013.01);  
(Continued)

(58) Field of Classification Search  
CPC .......................... H04N 9/3197; G02B 27/017  
USPC ........... 353/30, 31, 33, 34, 37, 38, 79, 94, 97, 353/98, 99, 102; 359/63, 618, 464, 466, 359/558, 559; 349/5, 7–9  
See application file for complete search history.

(56) References Cited

U.S. PATENT DOCUMENTS 7,740,360 B2 * 6/2010 Lee ................................. 353/82  
8,696,129 B2 * 4/2014 Pines et al. ........................ 353/7  
(Continued)

FOREIGN PATENT DOCUMENTS

DE  10 2009 024 894     12/2010  
JP       S62160437 A      7/1987  
(Continued)

*Primary Examiner* — Sultan Chowdhury  
(74) *Attorney, Agent, or Firm* — Michael A. Glenn; Perkins Coie LLP

(57) ABSTRACT

A projection display with an imaging system is described, which is implemented to generate individual images in a distribution, such as a two-dimensional distribution, of sub-areas of an imaging plane of the imaging system, and a multi-channel optics that is configured to map one allocated individual image or one allocated sub-area of the imaging system each per channel, such that the mapping of the individual images is at least partly superimposed to an overall image in a projection surface, wherein the projection surface is a non-planar free-form surface, such as a curved surface, and/or tilted with respect to the imaging plane, and the imaging system is implemented such that constellations of points in the sub-images, each superimposed in a respective common point in the overall image by the multi-channel optics, differ depending on what distance the respective common point in the overall image has to the multi-channel optics.

34 Claims, 19 Drawing Sheets

(51) Int. Cl.
*G03B 21/00* (2006.01)
*G03B 21/14* (2006.01)

(52) U.S. Cl.
CPC ............ *G03B21/142* (2013.01); *G03B 21/147* (2013.01); *H04N 9/3147* (2013.01); *H04N 9/3185* (2013.01)

(56) References Cited

U.S. PATENT DOCUMENTS

| | | | |
|---|---|---|---|
| 2002/0131022 A1* | 9/2002 | Shibatani | H04N 9/3197 353/31 |
| 2003/0107712 A1* | 6/2003 | Perlin | G03B 21/00 353/31 |
| 2005/0062948 A1 | 3/2005 | Van Der Mast et al. | |
| 2011/0228231 A1 | 9/2011 | Schreiber et al. | |

FOREIGN PATENT DOCUMENTS

| | | |
|---|---|---|
| JP | H02281287 A | 11/1990 |
| JP | H08286146 A | 11/1996 |
| JP | 2003140083 A | 5/2003 |
| JP | 2003177466 A | 6/2003 |
| JP | 2008076643 A | 4/2008 |
| JP | 2008309891 A | 12/2008 |
| WO | 2006116536 A1 | 11/2006 |
| WO | WO-2006/116536 | 11/2006 |
| WO | WO-2008/095584 | 8/2008 |
| WO | WO-2008/141247 | 11/2008 |
| WO | 2010145784 A1 | 12/2010 |
| WO | WO-2011/019398 | 2/2011 |

* cited by examiner

PROJECTION DISPLAY AND METHOD FOR DISPLAYING AN OVERALL IMAGE FOR PROJECTION FREE-FORM SURFACES OR TILTED PROJECTION SURFACES

CROSS-REFERENCE TO RELATED APPLICATIONS

This application is a continuation of copending International Application No. PCT/EP2012/058669, filed May 10, 2012, which is incorporated herein by reference in its entirety, and additionally claims priority from German Application No. 102011076083.0, filed May 18, 2011, which is also incorporated herein by reference in its entirety.

BACKGROUND OF THE INVENTION

Embodiments of the invention relate to a projection display and a method for displaying an overall image.

The projection of dynamic image contents on a screen or as a virtual image with a digital liquid crystal-based imaging system is based, according to conventional technology, on projection devices having a mapping optical channel or three channels whose optical paths unite in front of the projection optics for realizing color mixing.

In particular, US 2009 323 028 A1 shows pico projectors illuminated by LED in a color sequential manner. Further, US 2009 237 616 A1 describes a projection display having three color channels combined in front of the projection optics.

However, if the dimensions of the systems known in conventional technology are reduced for realizing miniaturized pico projectors, luminosity losses of the projected image result. Miniaturization of known projection systems is only possible in a limited manner due to the limitation of the transmissible light flux through the small surface of the imaging system existing in these systems. This connection is determined by the optical principle of etendue conservation. The etendue or light grasp of a light source $$E = 4\pi n^2 A \sin \Theta$$

results from its luminous surface A, the half angle of divergence $\Theta$ and the refractive index n and remains constant with an ideal optical mapping. Real optics increase the etendue or reduce system transmission. Thus, a minimum object surface is necessitated for a source having a given luminance for a minimum transmissible light flux within a projecting optical system.

It is a general problem in single-channel projection systems that due to optical laws (e.g. natural vignetting, mapping errors), together with this surface to be mapped, the system installation length also increases to the same extent, which makes miniaturization more difficult.

One solution for this problem is described in DE 102009024894. There, a projection display having a light source and regularly arranged optical channels is described. Due to a slightly reduced center pitch of the projection lenses with respect to the imaging structures, an offset of the respective imaging structure and the respective projection optics increasing towards the outside from the array center results, so that superposition of the real individual mappings or images results at a finite distance. Due to the partitioning into several channels, it is possible to reduce the distance between the imaging structure and the projection optics, i.e. the installation height, so that miniaturization is obtained simultaneously with other advantages.

However, problems occur when the above systems are used in connection with curved or tilted projection surfaces. All the above-described systems are only implemented in connection with the use of planar projection surfaces. Generally, the problem is the front projection of an image across greatly changing projection distances or tilted, curved surfaces, and free-form screen geometries while ensuring high contrast and sharp mapping. Sharp imaging can be obtained for a tilted planar screen by extensive tilting of object and projection optics according to the Scheimpflug principle. However, this known approach fails for curved projection surfaces. Tilting again increases the necessitated installation space. If even adaptivity to different degrees of tilting is to be realized, this necessitates mechanics for realizing the tilting between imaging structure and projection optics, which opposes the desired miniaturization and low production costs as well as robust construction. An increased f-number could solve the problem by increasing the depth of focus, but such an increased f-number is also accompanied by lower light intensity causing other problems and additionally also opposing miniaturization, since the problem would then be shifted to the light source.

SUMMARY

According to an embodiment, a projection display may have: an imaging system that is implemented to generate individual images in a distribution of sub-areas of an imaging plane of the imaging system; and a multi-channel optics that is configured to map one allocated sub-area of the imaging system each per channel, such that the mapping of the individual images is superimposed to an overall image in a projection surface, wherein the projection surface is a non-planar free-form surface or tilted with respect to the imaging plane, and the imaging system is implemented such that constellations of points in the individual images, each superimposed in a respective common point in the overall image by the multi-channel optics, differ depending on what distance the respective common point in the overall image has to the multi-channel optics.

According to another embodiment, a method for displaying an overall image may have the steps of: generating individual images in a distribution of sub-areas of an imaging plane; and mapping, by one channel of a multi-channel optics each, one allocated sub-area of the imaging plane each, such that the mapping of the individual images is superimposed to an overall image in a projection surface, wherein the projection surface is a non-planar free-form surface or tilted with respect to the imaging plane, and generation of the individual images is performed such that constellations of points in the individual images, each superimposed by the multi-channel optics in a respective common point in the overall image, differ depending on what distance the respective common point in the overall image has to the multi-channel optics.

According to another embodiment, a projection display may have: an imaging system that is implemented to generate individual images in a distribution of sub-areas of an imaging plane of the imaging system; and a multi-channel optics that is configured to map one allocated sub-area of the imaging system each per channel, such that the mapping of the individual images is superimposed to an overall image in a projection surface, wherein the projection surface is a non-planar free-form surface or tilted with respect to the imaging plane, and the imaging system and the multi-channel optics are implemented such that a manifestation of a contribution of each channel to the overall image varies locally across the overall image depending on what distance the respective common point in the overall image has to the multi-channel optics.

According to another embodiment, a method for displaying an overall image may have the steps of: generating individual images in a distribution of sub-areas of an imaging plane; and mapping, by one channel of a multi-channel optics each, one allocated sub-area of the imaging plane each, such that the mapping of the individual images is superimposed to an overall image in a projection surface, wherein the projection surface is a non-planar free-form surface or tilted with respect to the imaging plane, and generation and mapping are performed such that a manifestation of a contribution of each channel to the overall image varies locally across the overall image depending on what distance the respective common point in the overall image has to the multi-channel optics.

Another embodiment may have a computer program having a program code for performing the inventive methods when the program runs on a computer.

Embodiments of the present invention provide a projection display having an imaging system that is implemented to generate individual images in a distribution, such as a two-dimensional distribution, of sub-areas of an imaging plane of the imaging system, and multi-channel optics that is configured to map one allocated individual image or allocated sub-area each of the imaging system per channel, such that the mapping of the individual images is at least partly superimposed to an overall image in a projection surface, wherein the projection surface is a non-planar free-form surface, such as a curved surface, and/or tilted with respect to the imaging plane, and the imaging system is implemented such that constellations of points in the sub-images, each superimposed in a respective common point in the overall image by the multi-channel optics, differ depending on what distance the respective common point in the overall image has to the multi-channel optics.

It is the basic idea of the present invention that higher projection quality can be obtained, even when using projection free-form surfaces and tilted projection surfaces, with comparable miniaturization and comparable apparatus effort, when the imaging system is implemented such that constellations of points in the sub-images, each superimposed in a respective common point in the overall image due to the multi-channel optics, differ depending on what distance the respective common point in the overall image has to the multi-channel optics. Thereby, the differing distance of the points in the projection surface to the multi-channel optics or the projection display can be corrected. This does not increase installation height and apparatus effort. Merely the implementation of the imaging system is changed with respect to an implementation where the projection display is implemented for projection onto a plane-parallel projection surface. Alternatively, the aim can be achieved by implementing the imaging system and the multi-channel optics such that a characteristic of a contribution of each channel to the overall image varies locally across the overall image depending on what distance the respective common point in the overall image has to the multi-channel optics, since thereby the channels can be adjusted to different distances and combined in a suitable manner for superposition.

A passive imaging system, such as a shadow mask, can be used as the imaging system, or an active imaging system such as a digital imaging system, in which case dynamic adaptation of the projection display to different projection surfaces is also possible by changing the sub-areas in the imaging plane and the individual images generated in the same.

The projection optics of the multi-channel optics of the projection display can have decentration with respect to the allocated sub-areas of the imaging system so that the overall image superimposed in the projection surface is real or virtual. By decentration or central compression or extension between the projection optics and the allocated sub-areas of the imaging system, in particular, a projection distance of the overall image in the projection surface can be adjusted.

Further, the multi-channel optics can comprise a downstream overall lens cooperating with the projection optics of the individual channels, which is implemented to refocus collimated beams from the projection optics.

In further embodiments of the present invention, the downstream overall lens can be implemented as optics having a variable focal length, so that an average projection distance can be adjusted.

BRIEF DESCRIPTION OF THE DRAWINGS

Embodiments of the present invention will be detailed subsequently referring to the appended drawings, in which:

FIG. 9 is a side view of a projection display having two beam splitters and a half-wave plate interposed in the illuminating path;

DETAILED DESCRIPTION OF THE INVENTION

Before the present invention will be discussed in more detail below based on the figures, it should be noted that in the subsequently illustrated embodiments the same or functionally equal elements in the figures are provided with the same reference numbers. Thus, a description of elements having the same reference numbers can be interchanged and/or applied to different embodiments.

Figure 1:
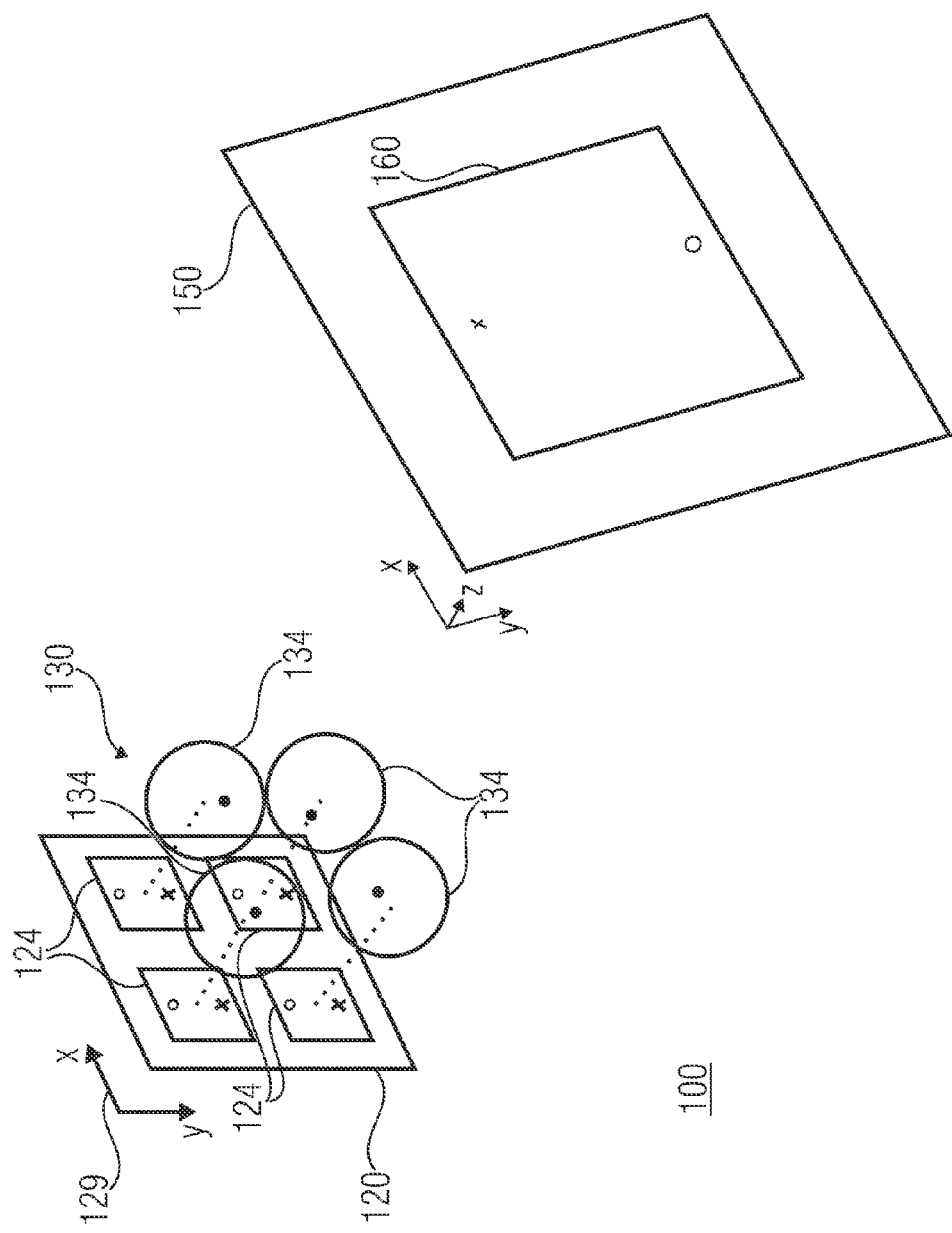
FIG. 1 is a schematic block diagram of a projection display according to an embodiment of the present invention.

FIG. 1 shows a projection display 100 according to an embodiment of the present invention. The projection display 100 comprises an imaging system 120 and multi-channel optics 130. The imaging system 120 is implemented to generate or display individual images in a distribution of sub-areas 124 of an imaging plane 129 of the imaging system 120. The multi-channel optics 130 is configured to map one allocated sub-area 124 of the imaging system 120 each per channel, such that the mapping of the individual images is partly superimposed to an overall image 160 in a projection surface 150.

In FIG. 1, the projection display 100 is exemplarily structured in a four-channel manner, i.e. the imaging system 120 generates individual images in four sub-areas 124, and the multi-channel optics 130 is accordingly structured in a four-channel manner with, for example, one respective projection optics 134 per channel. However, the number is merely exemplary. The two-dimensional distribution of the sub-areas 124 and the projection optics 134 is also merely exemplary. The distribution could also be realized along a line. Additionally, the distribution is not limited to regular two-dimension distributions. As will be discussed in more detail below, the center pitch of the projection optics 134 is reduced, for example, with respect to a center pitch of the sub-areas 124 in the imaging plane 129. Details will be provided below.

The projection display 100 of FIG. 1 is implemented such that the projection surface does not have to be a planar projection surface parallel to the imaging plane 129. The projection surface, in which the overall image is generated, where the individual images are superimposed in a sharply focused manner, i.e. the depth of focus area, can rather be a free surface or a projection surface 150 tilted with respect to the imaging plane 129, as is exemplarily shown in FIG. 1.

For compensating the deviation with respect to the plane-parallel orientation of the projection surface 150 with respect to the imaging plane 129, the imaging system 120 is implemented such that constellations of points in the individual images, each superimposed in a respective common point in the overall image 16 due to the multi-channel optics 130, differ depending on what distance the respective common point in the overall image has to the multi-channel optics 130. FIG. 1 exemplarily shows two such common points in the overall image 160, namely one with an x and the other one with an o. The points in the individual images of the sub-areas 124 corresponding to these points across the multi-channel optics 130 are accordingly also indicated by an x or an o. The position of the points o or the position of the points x in the imaging plane 129 respectively form a constellation together.

The constellation of points o and the constellation of points x differ in order to compensate for the fact that the distance of the common point x along the optical axis of the projection display, in FIG. 1 exemplarily the normal direction or z axis to the imaging plane 129, to the projection display 100 or the multi-channel optics 130 is smaller than the distance of the common point o. As will be discussed in more detail below, the difference caused by the different distances in the constellations results mainly in a larger extension in the sense of a centric extension of the constellation of the points x relative to the constellation of the points o. However, the constellations can also differ depending on the fact in what solid angle area, seen from the multi-channel optics 130, for example relative to the optical axis (here exemplarily z), the respective common point o or x lies in order to compensate mapping errors of the multi-channel optics 130 or the individual projection optics 134. In particular, the solid angle area differences can be implemented such that imaging errors of the multi-channel optics 130 can be compensated individually per channel. The exact correlations will follow in more detail in the following description.

In other words, the embodiment of FIG. 1 will be discussed again based on a specific implementation where detailed images of all four channels are exemplarily superimposed completely or congruently. As has already been mentioned above, this is not absolutely necessitated. A different superposition of the individual images to produce the overall image 160 is also possible.

Thus, the individual images in the sub-areas 124 have essentially the same contents. They all represent one version of the overall image 160. Possibly, the individual images in the sub-areas 124 or the sub-areas themselves are distorted with respect to the, for example rectangular, overall image 160, with a pre-distortion which can be the same for all individual images. The pre-distortion corrects, for example, the distortion resulting from the divergence of the optical path of the mappings individual for each channel or the magnification by the mappings individual for each channel depending on their focal length and the distance to the projection surface and the resulting dimensional change across the overall image 160 due to the deviation of the projection surface 150 from the actual image plane to the multi-channel optics 130, which can be in infinity, for example. The pre-distortion might not be identical across all channels. In order to address a distortion ($3^{rd}$ order) exceeding first-order aberrations (trapezoid), it can be advantageous to pre-distort the individual images or sub-areas 124 differently, as different decentrations of the respective channels exist. Changing the constellations across the array for tilted projection surfaces will then be added, as will now be discussed below.

The individual images in the sub-areas 124 pre-distorted with respect to the overall image 160 do differ in order to realize the above-mentioned constellations of points in the sub-images 124 corresponding to a common point in the overall image 160, such that the sharpness of the overall image 160 is maintained across the whole lateral extension, despite the depth variation of the projection surface 150 along the optical axis z of the projection display 100.

Further differences in the individual images in the sub-areas 124 can be caused by the above-mentioned correction of mapping errors of the multi-channel optics 130 per channel, which, however, does not depend on the lateral variation of the distance of the projection surface to the projection display 100.

In this way, the overall image 160 can be projected onto the projection surface 150 such that the same appears undistorted and sharp from a specific perspective, such as perpendicular to the projection surface 150.

The projection display 100 of FIG. 1 can serve different purposes and can be used in different fields of application. The projection display of FIG. 1 is, for example, one that is intended to project a predetermined overall image sharply onto a predetermined projection surface 150 that has a constant and stationary position with respect to the projection display 100. The projection display 100 could, for example, be provided to project an overall image 160 representing, for example, an inscription or another content, onto a sculpture whose external surface forms the projection surface 150, wherein in this type of application the projection display 100 is intended to be positioned and to remain at a fixed position with respect to the sculpture. In this case, the imaging system 120 can be a shadow mask or another finely structured mask which is illuminated, for example, from the rear opposing the multi-channel optics 130, for example by means of Köhler illumination. The individual images could be realized in the sub-areas 124 binary-coded, gray-scaled or even color-coded, either in an analog or continuous or pixelated form. The mask 120 could in particular be a slide or, in the sub-areas 124, individual slides. Coding of image information could be realized particularly by mapping the image information on a transmission scale. An example of rear illumination will be discussed in more detail below. Imaging systems 120 in the form of a mask could, however, also work reflectively to generate static individual images in the sub-areas 124. Examples of reflective systems will also be presented below.

Instead of a passive or static imaging system 120, an active imaging system, such as a digital imaging system 120, can be used. The imaging system can operate in a transmissive or a reflective manner. However, it is also possible that the imaging system is self-luminous, such as an OLED or an LED display. In these cases, it is possible that, as will be discussed in more detail below, the imaging system is, for example, internally implemented to perform the above-mentioned processes which, from incoming pixel array data representing the overall image 160, provide the position and the contents, namely the individual images of the sub-areas 124, at first, in order for them to then be displayed by the imaging system 120, adapted to a specific relative position of the projection surface 150 to the projection display 100, which also enables in particular an adaptation to other projection surface geometries is possible by accordingly adapting or re-performing the pre-processing. This will also be discussed in more detail below.

Finally, it should be noted that the imaging system 120 and the multi-channel optics 130 can be stationary to one another, such as installed in a housing. In particular, the projection display 100 can be installed in a mobile device such as a mobile phone, a PDA, a notebook or any other portable computer or the like.

After having described an embodiment for a projection display in general above, different options will be discussed with reference to FIGS. 2a-d as to how the optical or apparatus part of the projection apparatus 100 can be formed. The embodiments of FIGS. 2a-d are not to be seen as limiting, but represent advantageous implementations.

Figure 2A:
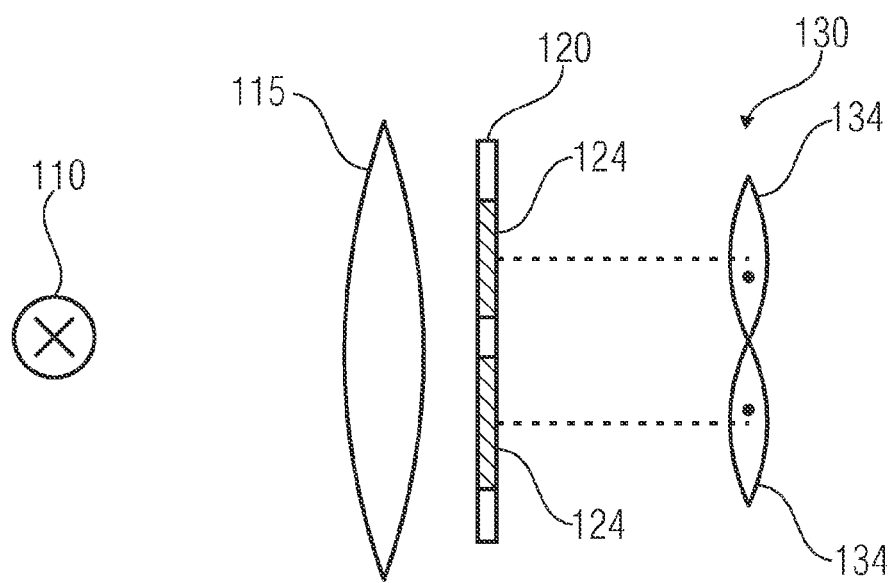
FIGS. 2a-2d are schematic side views of projection displays according to different embodiments.

FIG. 2a shows an implementation of a projection display according to FIG. 1 where the imaging system 120 operates transmissively or displays the individual images in the sub-areas 124 by displaying or encoding the luminosity variation or color variation in the individual images by lateral variation in the transmission. As is shown in FIG. 2a, for realizing rear illumination, i.e. illumination from a side of the imaging system 120 facing away from the multi-channel optics 130, the projection apparatus can comprise a light source 110 and a field lens 115. The distance between the sub-images 124 and the field lens 115 is selected to be small in order to realize complete illumination of the imaging system 120. Additionally or alternatively, Köhler illumination of the multi-channel optics 134 is realized, according to which the field lens 115 maps the light source 110 into the opening of the pupil of the projection optics 130.

Figure 2B:
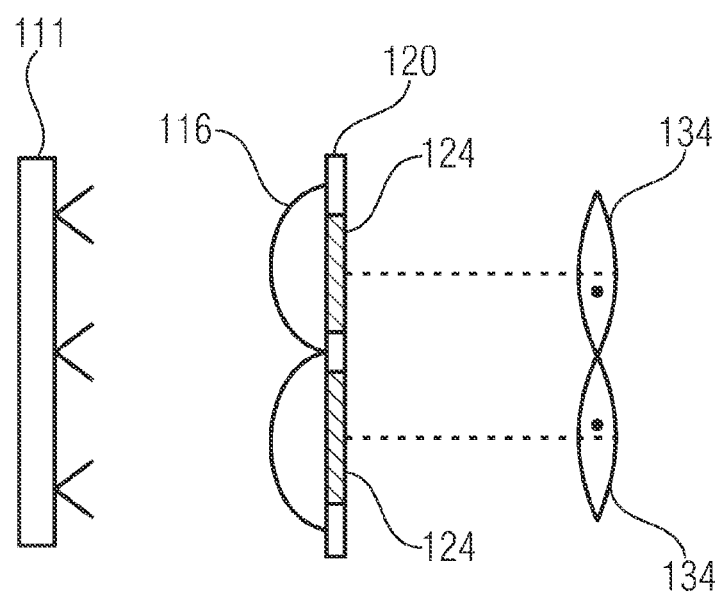

FIG. 2b shows that a field lens array 116 could be used instead of a field lens and that additionally or alternatively instead of a point-shaped light source 110 a planar light source 111 could be positioned on the rear for illumination, i.e. such that the field lens array 116 or the field lens 115 are arranged between the light source 111 and the imaging system 120. Here, also, Köhler illumination can be realized. The planar light source can, for example, be an array of LEDs with allocated collimation optics for realizing illumination units that are also structured in a very planar manner.

Figure 2C:
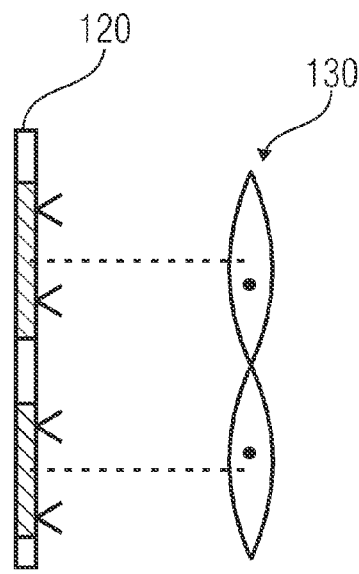

FIG. 2c shows that a self-luminous imaging system, such as a digital imaging system, can also be used as the imaging system 120. The illumination technology could be OLED-based, LED-based, TFT-based or implemented differently.

Figure 2D:
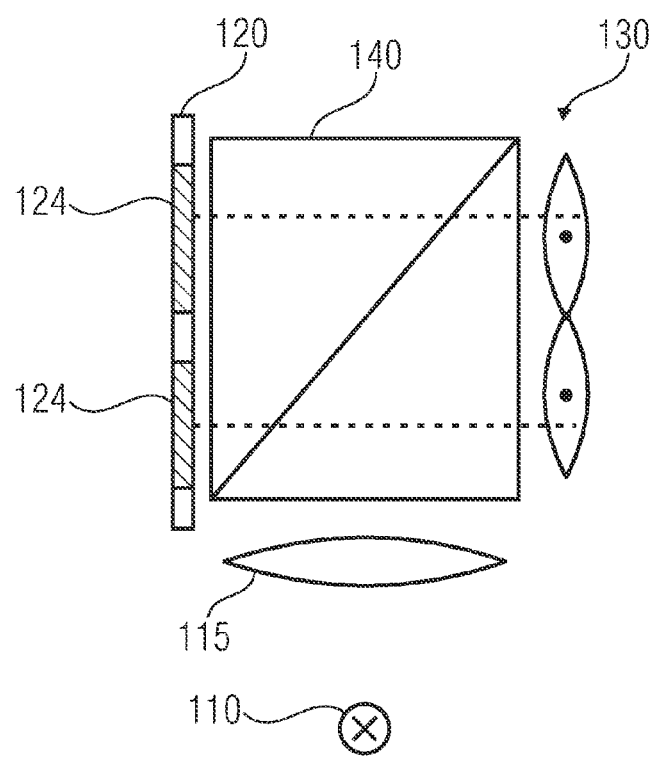

FIG. 2d shows a reflective structure of the projection display, according to which the imaging system 120 is a reflective imaging system and a front side illumination is realized by means of a beam splitter 140 arranged between the multi-channel optics 130 and the imaging system 120 which is illuminated laterally, for example via a combination of condenser optics 115 and the light source 110 in order to illuminate the sub-areas 124 of the imaging system 120. Details will become clear from the following discussion.

The imaging system 120 can, for example, be a reflective LCD imaging system 120, just as well as the imaging system sensor of the embodiments according to FIGS. 2a and 2b could be a transmissive LCD imaging system.

After having described the basic implementation options of the embodiment of FIG. 1, possible details of the optical assembly of a projection display will be discussed based on the following figures. For explaining the optical structure, it is first assumed that the projection surface 150 is planar and runs parallel to the imaging plane of the imaging system, However, these statements will also show that the optical structure of the projection display will accommodate the desire for sharp projection onto a differently shaped or positioned projection surface in that, due to the multi-channel optical structure, the optical depth of focus basically exists anyway. Due to the normally very short focal lengths of, for example, a few millimeters, the depth of focus range of each individual projector or each channel in the array 132 is very high compared to a conventional single-channel assembly. These circumstances are utilized according to the embodiments of the present invention to finally produce the actual sharpness of the projection onto a tilted or free surface-shaped projection surface by appropriately changing the individual images or sub-areas with respect to a plane-parallel orientation of the projection surface, which, in the case of a digital imaging system, merely necessitates, for example, digital image pre-processing. Only after this description will the case be discussed that the projection surface is not oriented plane-parallel to the imaging plane or does not have to be and also the additional measures necessitated to react to the deviation according to embodiments of the present invention.

Figure 3:
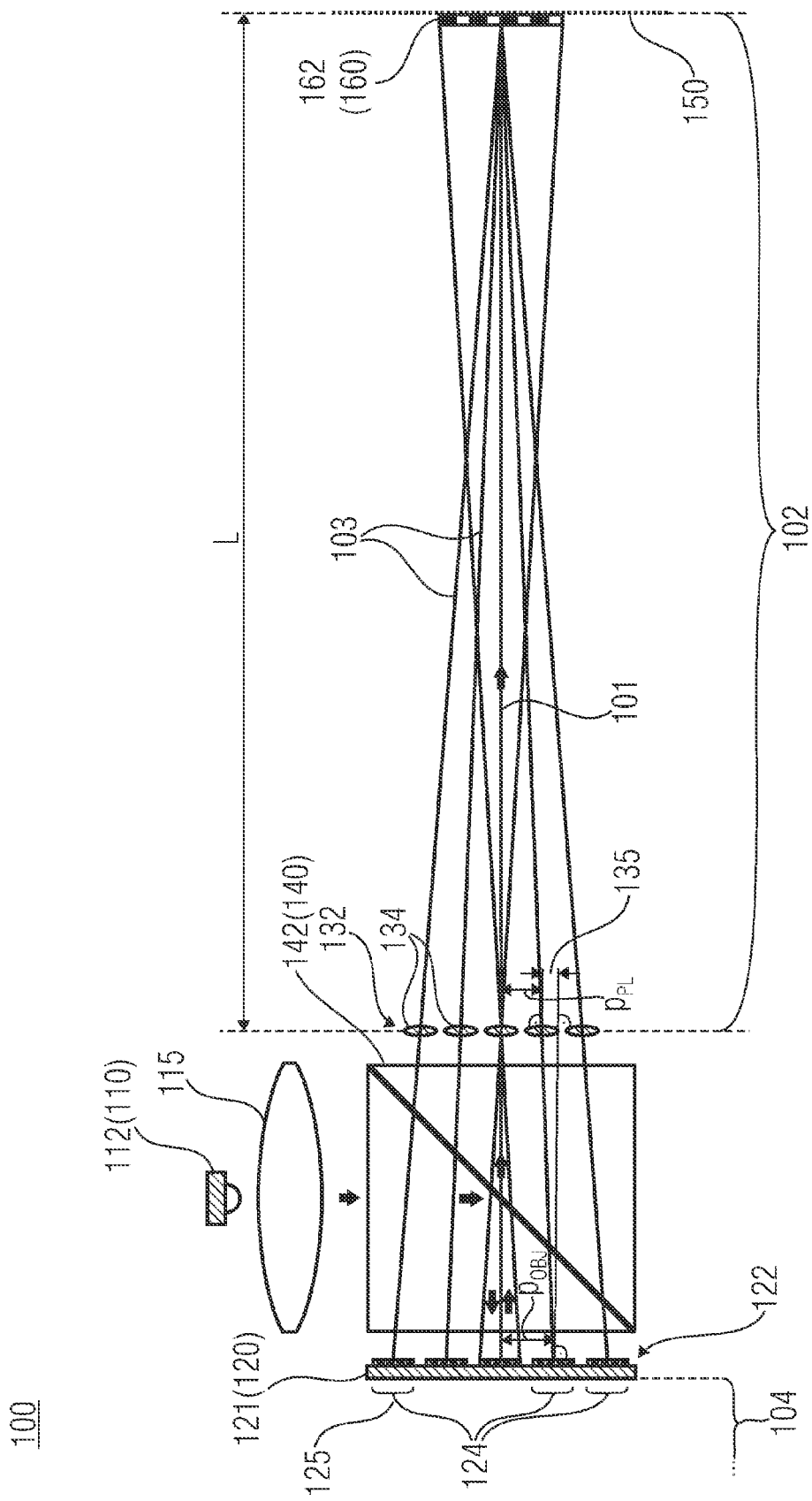
FIG. 3 is a side view of a projection display according to a further embodiment.

FIG. 3 shows a side view of a projection display 100 according to an embodiment of the present invention. The projection display 100 shown in FIG. 1 comprises a light source 110, an imaging system 120, here exemplarily implemented in a reflective manner, a two-dimensional array or assembly 132 of projection optics 134 as multi-channel optics 130 and a beam splitter 140. Here, the imaging system 120 is implemented to display individual images in a two-dimensional distribution 122 of sub-areas 124 of the same. Further, the two-dimensional assembly 132 of projection optics 134 is configured to map an allocated sub-area 125 of the imaging system 120 along optical axes 103, so that mappings of the individual images are superimposed to an overall image 160 in the projection surface 150. Finally, the beam splitter 140 is arranged, on the one hand, in an optical path between the imaging system 120 and the two-dimensional assembly 132 of the projection optics, and on the other hand, in the optical path between the light source 110 and the imaging system 120.

In particular, in further embodiments, the beam splitter 140 can have a polarizing effect and the reflective imaging system 120 can be implemented to display the individual images in the form of a polarization influence.

The projection display can comprise a regular, two-dimensional assembly of imaging areas on the imaging system 120, which is implemented, for example, as a liquid crystal imaging system 121, a beam splitter 140, which is implemented, for example, as a polarizing beam splitter 142, and the two-dimensional assembly 132 of projection optics 134. As is shown in FIG. 3, light from the light source 110, for example implemented as LED 112, first passes through a condenser optics 115 and is then guided again to the polarizing beam splitter 142. From there it is finally reflected in a polarized manner in the direction of the reflective imaging system 120, which is, for example an LCoS imaging system (LCoS=liquid crystal on silicon).

Depending on the gray scale of the image point to be displayed, the, for example, digital imaging system rotates the polarization direction of light reflected at the same and hence controls the transmission during the second pass through the polarizing beam splitter. Fast switching of the voltages or crystal rotations per pixel allows the display of dynamic image contents.

The projection optics 134 shown in FIG. 3 could, for example, be microlenses implemented in a regular two-dimensional assembly as projection objectives, each mapping a sub-area 125 of the imaging system 120 onto the projection surface 150 or a screen. By using such a projection assembly, it becomes possible to drastically reduce the installation length of the overall system with respect to conventional single-channel projectors of the same image size. While a small installation length of the projection display or projection system results from focal lengths of the projection optics or lenses of, for example, a few millimeters, wherein their focal lengths again depend on the dimensions of the beam splitter, multiplication of the object surfaces or lateral extensions provides a proportional increase in image luminosity. Thus, compared to miniaturized single-channel projectors, an installation length exceeding the thickness of the beam splitter by only a few millimeters is obtained, and this with comparable lateral extension and projection distances.

In further embodiments, the projection image can be produced by superposing, putting together or interleaving the mappings of individual channels of the assembly.

In further embodiments, the projection optics 134, as shown exemplarily in FIG. 3, have decentration 135 with respect to the allocated sub-areas 124.

Generally, decentration can be seen as a central compression or extension with respect to a central optical axis 101 or as a lateral offset of the projection optics 134 with respect to the allocated sub-areas 124 of the imaging system 120. Decentering the projection optics with respect to the allocated individual images on the imaging system is decisive for projection distance. Due to a large depth of focus of the sub-images, the focus or sharpness at the projection distance depends only in a limited manner on the screen-side focusing of the individual projection optics. As has already been mentioned, on the object side, focusing the projection optics 134, for example relative to the short focal length of the projection optics, can be adjusted exactly such that the imaging plane 129 is within the focal length of the projection optics 130. However, this is not compulsory. As has already been mentioned, for virtual images or very close projection distances, the imaging plane 129 can be shortly in front or behind. Depending thereon, the screen-side focusing is, for example, in infinity, but the depth of focus area of the individual channels is large due to the relatively short focal lengths. This circumstance is utilized according to FIG. 1 and also the following description when the image or projection surface 150 does not run plane-parallel to the imaging plane 129, but tilts out of the same or varies in another way according to a free-form surface.

By a slightly reduced center pitch (pitch) of the projection optics or projection lenses to the imaging structures, an offset 135 of the respective imaging structure and the respective projection optics increasing towards the outside from the central optical axis 101 of the two-dimensional assembly 132 of the projection optics 134 or array center (grid center) results. The resulting slight tilting of the optical axes 103 of external projection optics 134 or projectors with respect to the central optical axis 101 or the central channel results in a superposition of individual mappings in the image plane or projection surface 150 to the overall image 160. Here, the image plane or projection surface can here be infinity or at a finite distance to the projection optics in front of the imaging system or behind the imaging system. As is shown in FIG. 1, the area in front of the imaging system is defined by the area 102 on the right or in the optical path after the two-dimensional assembly 132 of projection optics 134, while the area behind the imaging system is defined by the area 104 on the left of the imaging system 120 or on the side of the imaging system 120 facing away from the beam splitter 140. The individual mappings can be superimposed to the overall image, for example on a screen.

Here, no further macroscopic optical elements are necessitated for projection in the optical path. The projection distance L of the array projection display (i.e. the average distance L of the projection surface 150 to the two-dimensional assembly 132 of projection optics 134 perpendicular to the same) which is, in the case of a non-plane-parallel projection surface 150, an average projection distance, results from the focal length of the projection optics f, the center pitch of the projection optics $p_{PL}$ and the center pitch of the images $p_{OBJ}$. Magnification M of the mappings results from the ratio of the projection distance L to the focal length of the projection lens f. Here, the following relations apply:

$$L = \frac{f \cdot p_{PL}}{p_{OBJ} - p_{PL}}$$

$$M = \frac{L}{f} = \frac{p_{PL}}{p_{OBJ} - p_{PL}}.$$

Thus, the ratio of the center pitches of object structures to projection optics or their difference controls the projection distance. Here, it should be noted that in the case of a non-plane-parallel projection surface 150 the center pitch of sub-areas 124 $p_{OBJ}$, for example, represents the average of all corresponding points in the individual images, or an average of the distances of the area centers of the sub-areas 124, which can, for example, be distorted, on the one hand for compensating the optical distortion as described above with reference to FIG. 1, and on the other hand for local sharpness readjustment. Details will be discussed below.

If the center pitch of the projection optics is smaller than that of the imaging structures, a real image results at a defined distance. In the case shown in FIG. 1, the center pitch $p_{PL}$ of the projection optics 134 is smaller than the center pitch $p_{obj}$ of the allocated sub-areas 124. Thus, in the embodiment in FIG. 1, an overall image 162 superimposing in the projection surface 150 is real. FIG. 1 is also based on this example.

Figure 4:
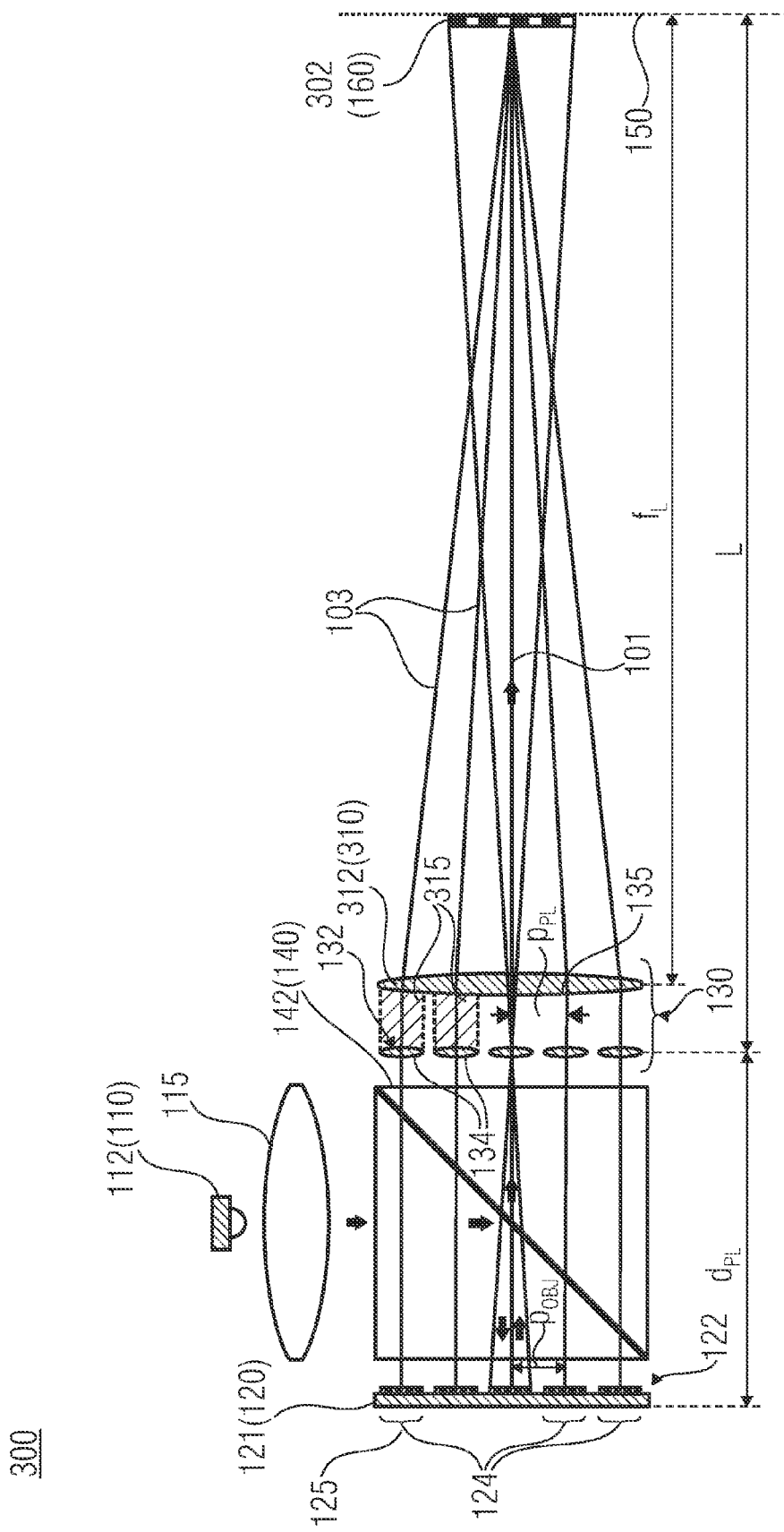
FIG. 4 is a side view of a projection display according to a further embodiment.

FIG. 4 shows a side view of a projection display according to a further embodiment. In the embodiment shown in FIG. 4, the multi-channel optics 134 further comprises an overall lens 310 which is downstream with respect to the two-dimensional assembly 132 of projection optics 134 and cooperates with the two-dimensional assembly 132 of projection optics 134. In this context, downstream means that the overall lens 310 is arranged in the optical path after the two-dimensional assembly 132 of projection optics 134. In FIG. 4, the overall lens 310 is implemented in particular to refocus collimated beams 315 from the projection optics 134 such that the image plane or projection surface 150 of an overall image 302 lies within a focal plane of the overall lens 310, or the projection surface 150 deviating locally from a plane-parallel arrangement is in the depth of focus area. These circumstances are illustrated in FIG. 4 such that the multi-channel optics 150 has an average distance $f_L$ to the overall lens 310 where the individual mappings are superimposed to the overall image 302. Further, the distance $d_{PL}$ of the two-dimensional assembly 132 of projection optics 134 to the imaging system 120 can be adjusted by the imaging system 120 such that the same approximately corresponds to the focal length of the projection optics 134.

In FIG. 4, it can be seen that the projection optics 134 are centered and act in a collimating manner with respect to the allocated sub-areas 124. This means that in this embodiment the center pitch $p_{PL}$ of the projection optics 134 is equal to the center pitch $p_{OBJ}$ of the allocated sub-areas 124.

If the structure is modified accordingly, as is exemplarily shown in FIG. 4, by adjusting the distance $d_{PL}$ of the projection optics to the imaging system such that the individual images are formed in infinity, the pitch of the sub-images corresponds to the pitch of the projection optics, and if the overall lens 310 is arranged, for example, in the form of a converging lens 312 in the optical path after the two-dimensional assembly of projection optics or the array optics, the overall image 302 is formed in the focal plane of the lens 310. When using a converging lens, a real image is projected onto a screen. An advantage of the embodiment shown in FIG. 4 is the reduced vignetting of projection channels 103 remote from the axis compared with the structure shown in FIG. 3 and the option of adjusting different average projection distances by using a variable converging or diverging lens, for example in the form of a zoom objective or a liquid lens.

In particular, the downstream overall lens 310 shown in FIG. 4 can be implemented as optics having a variable focal length, so that a projection distance can be adjusted. It can be seen in FIG. 4 that the projection distance L, apart from a longitudinal extension of the projection optics assembly 130, is essentially given by the focal length $f_L$ of the overall lens 310.

Figure 5:
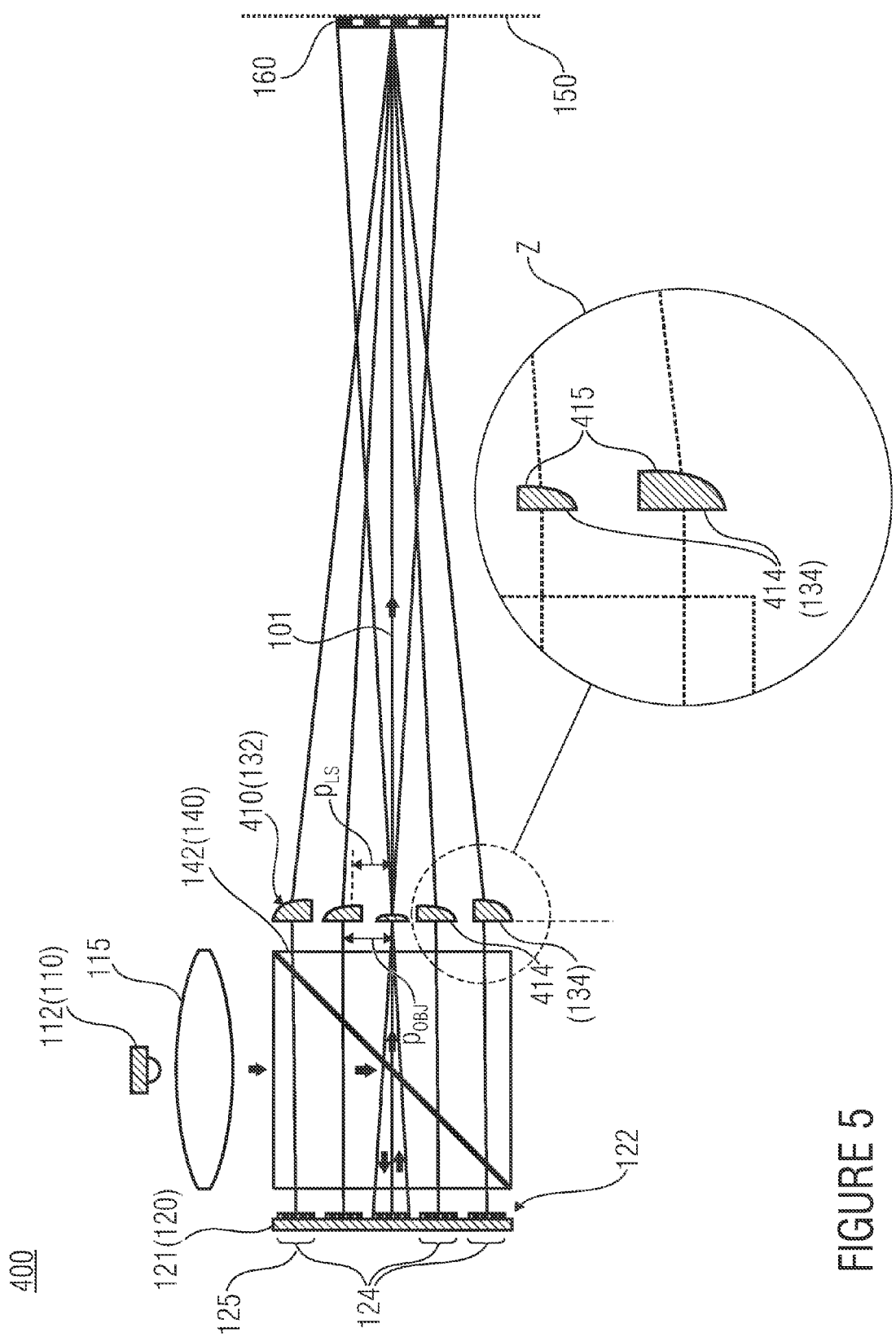
FIG. 5 is a side view of a projection display with a lens vertex decentered with respect to the aperture of a respective projection optics.

The optical effect of a downstream converging or diverging lens can also be obtained by a specific implementation of the projection array, as is exemplarily shown in FIG. 5. FIG. 5 shows, in particular, a side view of an inventive projection display 400. In the embodiment shown in FIG. 5, the two-dimensional assembly 132 of projection optics 134 is implemented as a projection array 410 or a two-dimensional assembly, wherein each projection optics 414 of the projection array 410 has a lens vertex 415 decentered with respect to the aperture of the respective projection optics.

The projection optics 414 of the two-dimensional assembly 410 shown in FIG. 5 essentially correspond to the projection optics 134 of the two-dimensional assembly 132 shown in FIGS. 3 and 4. In an enlarged representation (circle Z), the individual lens vertexes 415 of the projection optics 414 can be seen more clearly. Decentration of the lens vertexes 415 can, for example, be implemented such that the projection optics 414 of the two-dimensional assembly 410 together achieve the same effect as the projection optics assembly 130 shown in FIG. 4 with the downstream overall lens 310. As is exemplarily shown in FIG. 5, here a center pitch $p_{LS}$ of the lens vertex 415 is smaller than the center pitch $p_{OBJ}$ of the allocated sub-areas 124. Thus, each lens can effect projection of the individual image of the respective sub-area 125 onto the projection surface 150. There, the mappings of the individual images are superimposed to the overall image 160.

If, accordingly, projection lenses having a lens vertex increasingly offset with the distance to the central optical axis 101 or system axis with respect to the aperture are used, the optical function of the overall lens, such as a converging lens, can be shifted into the projection or lens array. It is an advantage of the embodiment shown in FIG. 5 that an optical component can be saved while maintaining the reduced vignetting of channels remote from the axis.

Figure 6:
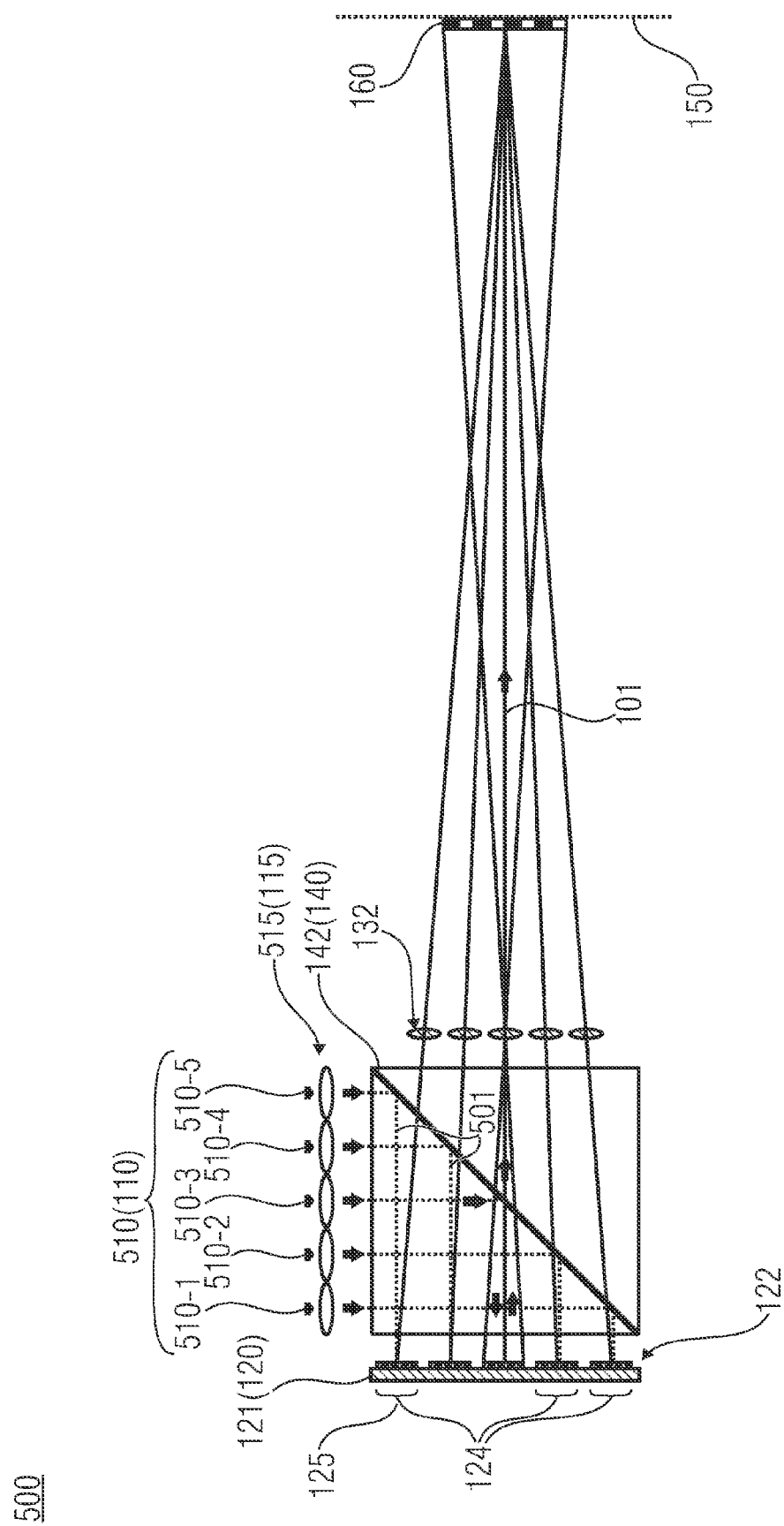
FIG. 6 is a side view of a projection display with a grid assembly of light sources.

FIG. 6 shows the option of using array light sources. FIG. 6 shows an inventive projection display 500 having a grid assembly 510 of light sources. Here, the grid assembly 510 shown in FIG. 6 essentially corresponds to the light source 110 in FIGS. 3 to 5. Further, FIG. 6 shows a condenser optics assembly 515. The condenser optics assembly 515 of FIG. 6 essentially corresponds to the condenser optics 115 in FIGS. 3 to 5. As is shown in FIG. 6, the grid assembly 510 comprises a plurality of light sources 510-1, 510-2, ..., 510-5, wherein a condenser optics of the condenser optics assembly 515 is allocated to each light source. Particularly, the grid assembly 510 of light sources and the condenser optics assembly 515 can be implemented such that light from the individual light sources 510-1, 510-2, ..., 510-5 is respectively guided onto allocated sub-areas 124 of the imaging system 120, as is illustrated in FIG. 6, by illuminating paths 501. It is an advantage of the embodiment shown in FIG. 6 that by superimposing many individual images, as is also the case in the assembly described above, normally no specific measures for homogenization of the illumination need to be taken. A further advantage of the use of array light sources, such as collimated LED arrays, is the resulting reduced increase of the lateral extension of the overall assembly.

Figure 7:
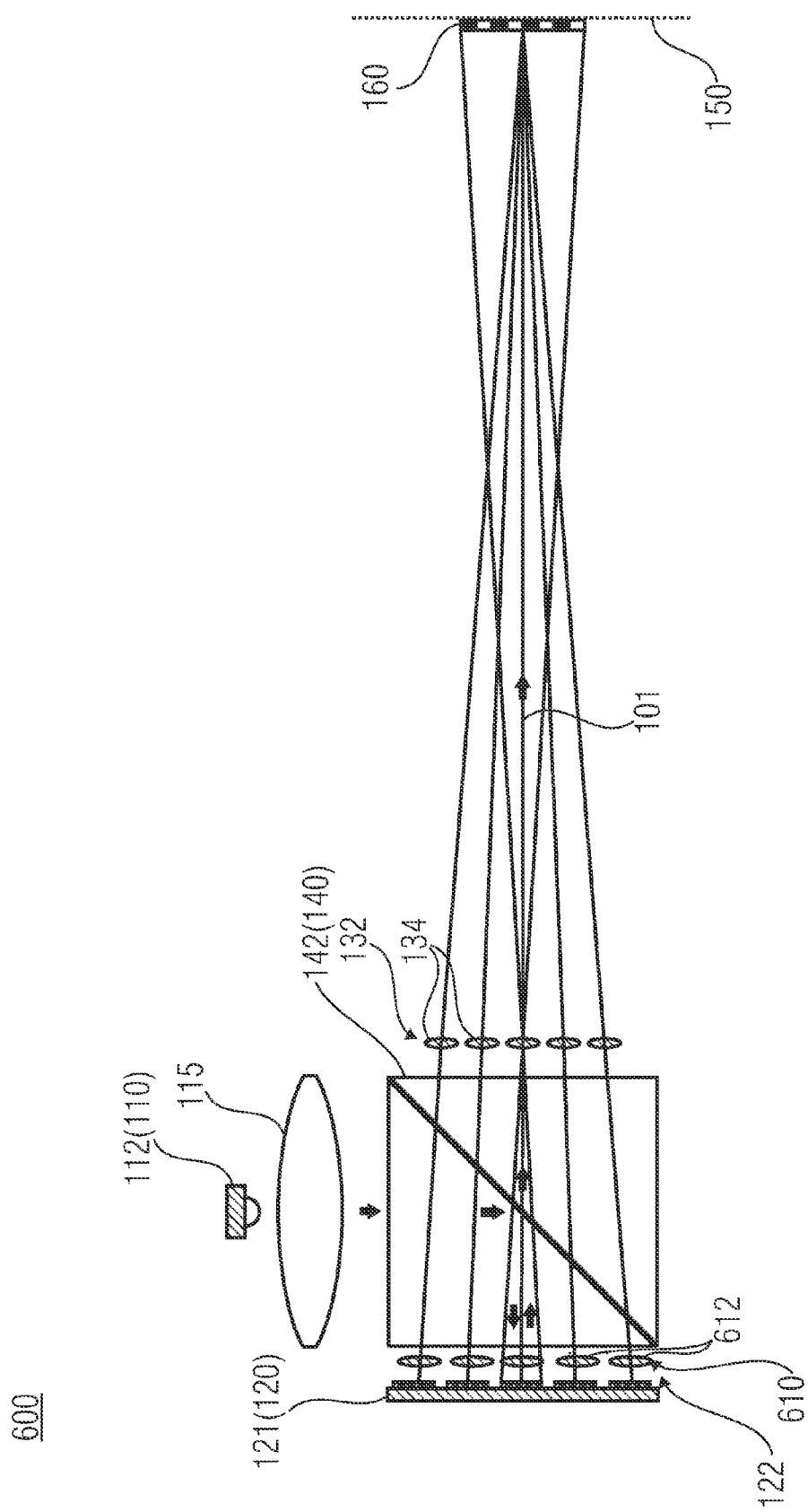
FIG. 7 is a side view of a projection display with a two-dimensional assembly of field lenses.

FIG. 7 shows a side view of a projection display 600 having a two-dimensional assembly 610 of field lenses 612. In the embodiment shown in FIG. 7, the two-dimensional assembly 610 of field lenses 612 is arranged at least in an optical path between the imaging system 120 and the beam splitter 140. Here, each field lens 612 in the two-dimensional assembly 610 is allocated to a projection optics 134 in the two-dimensional assembly 132 of projection optics 134. By this use of the two-dimensional assembly 610 of field lenses 612, Köhler illumination of each projection optics 134 in the two-dimensional assembly 132 can be obtained.

Particularly, in the projection display 600, a focal length $f_{FL}$ of the field lenses 612 can lie between 1.5 times and 2.5 times of a focal length $f_{PL}$ of the projection optics 134.

In other words, the use of the two-dimensional assembly of field lenses or a field lens array between the beam splitter and the imaging system shown in FIG. 7 allows Köhler illumination of the projection optics, whereby the image luminosity can be increased with simultaneously improved stray light suppression.

In further embodiments, stray light suppression can be further improved by using absorbing apertures (not shown in FIG. 7) in the plane of the field lens arrays covering the areas between the lenses. Generally, the use of such an aperture array between imaging system and polarizing beam splitter is useful even without a field lens array for stray light suppression.

Figure 8:
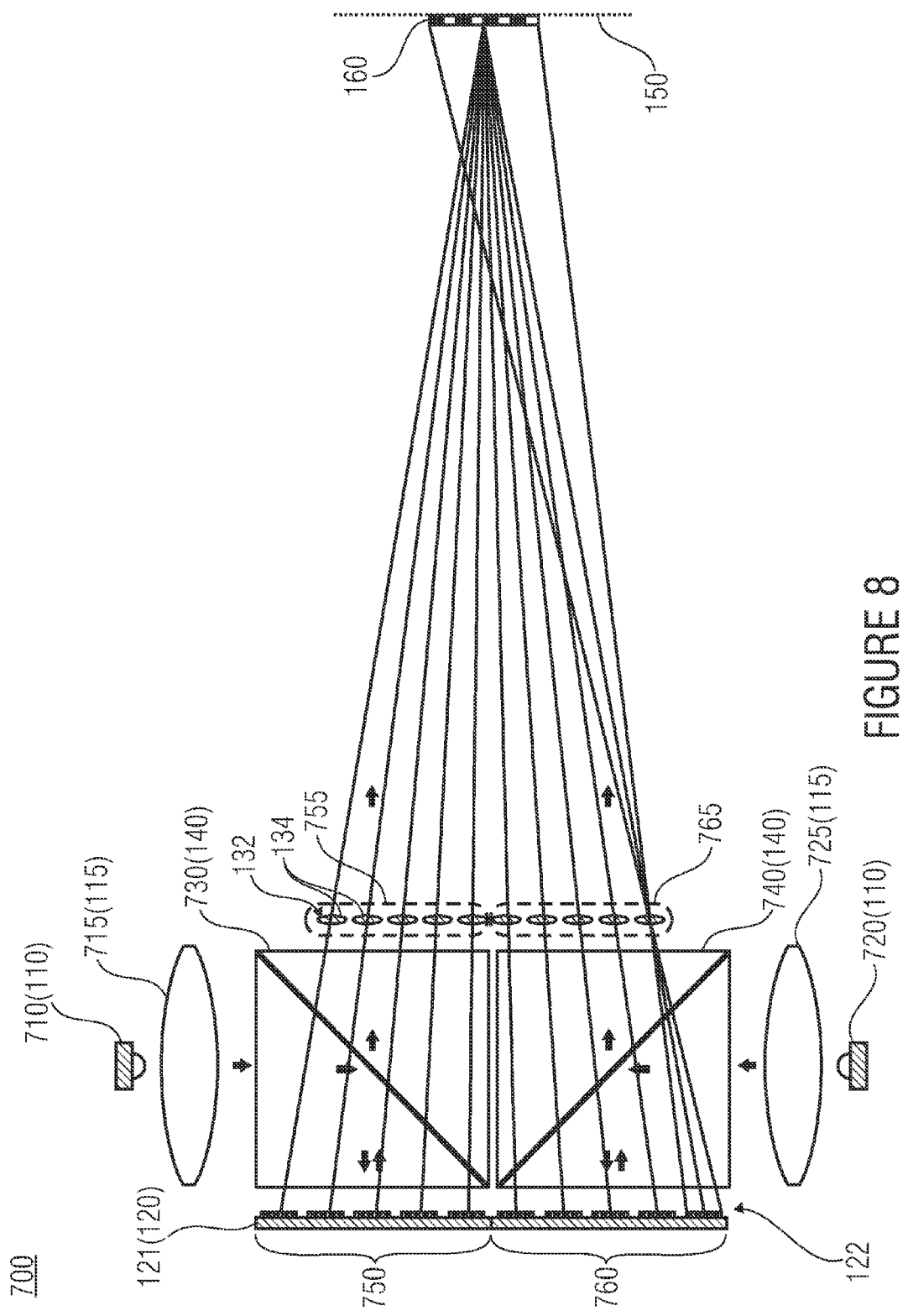

In further embodiments of the present invention, illumination can also take place from several sides by respective, for example collimated, light sources. FIG. 8 shows a side view of a projection display 700 having two beam splitters 730, 740 and opposing light sources 710, 720 for two-sided illumination of a reflective imaging system. In FIG. 8, the projection display 700 in particular has first and second light sources 710, 720 and first and second beam splitters 730, 740 arranged between the imaging system 120 and the two-dimensional assembly 132 of projection optics. Here, the first beam splitter 730 is arranged in the optical path between the first light source 710 and a set 750 of sub-areas of the imaging system 120, and the second beam splitter 740 in the optical path between the second light source 720 and the second set 760 of sub-areas of the imaging system 120.

As is shown in FIG. 8, a first lateral area 750 of the imaging system 120 is illuminated essentially by the first light source 710 and an allocated first condenser optics 715, while a second lateral area 760 of the imaging system 120 is illuminated essentially by the second light source 720 and an allocated second condenser optics 725. Here, the first and second light sources 710, 720 and allocated first and second condenser optics 715 and 725 essentially correspond to the light source 110 or the condenser optics 115 of the above-described embodiments. Contrary to the use of a single beam splitter, the two-sided illumination with two light sources 710, 720 and two polarizing beam splitters 730, 740 shown in FIG. 8 allows approximately halving the installation length of the projector.

In further embodiments of the invention, the projection optics can also differ in that they are corrected more for distortion for the respective color spectrum by which the sub-area mapped by the respective projection optics can be illuminated than for one of the other color spectra of the different color spectra.

In further embodiments of the invention, in the two-dimensional assembly 132 of projection optics, the projection optics 134 can be corrected for defocusing and/or astigmatism and/or coma which increase with increasing distance to the optical axis 101 of the imaging system 120 and the projection optics assembly.

Finally, in further embodiments, the imaging system 120 can be implemented such that a size of the sub-areas 124 continuously changes with increasing distance to the optical axis 101 of the imaging system 120 and the projection optics assembly 130, so that the individual images in the projection surface have the same size.

By such a continuous change in the size of the sub-areas, with increasing distance to the central optical axis 101 or the central channel, an increasing object distance and hence a lower magnification of outer projection optics 103 with respect to the central channel in the case of decentration, as is exemplarily shown in FIG. 1, can be compensated during projection of the individual images onto the projection surface 150.

Figure 9:
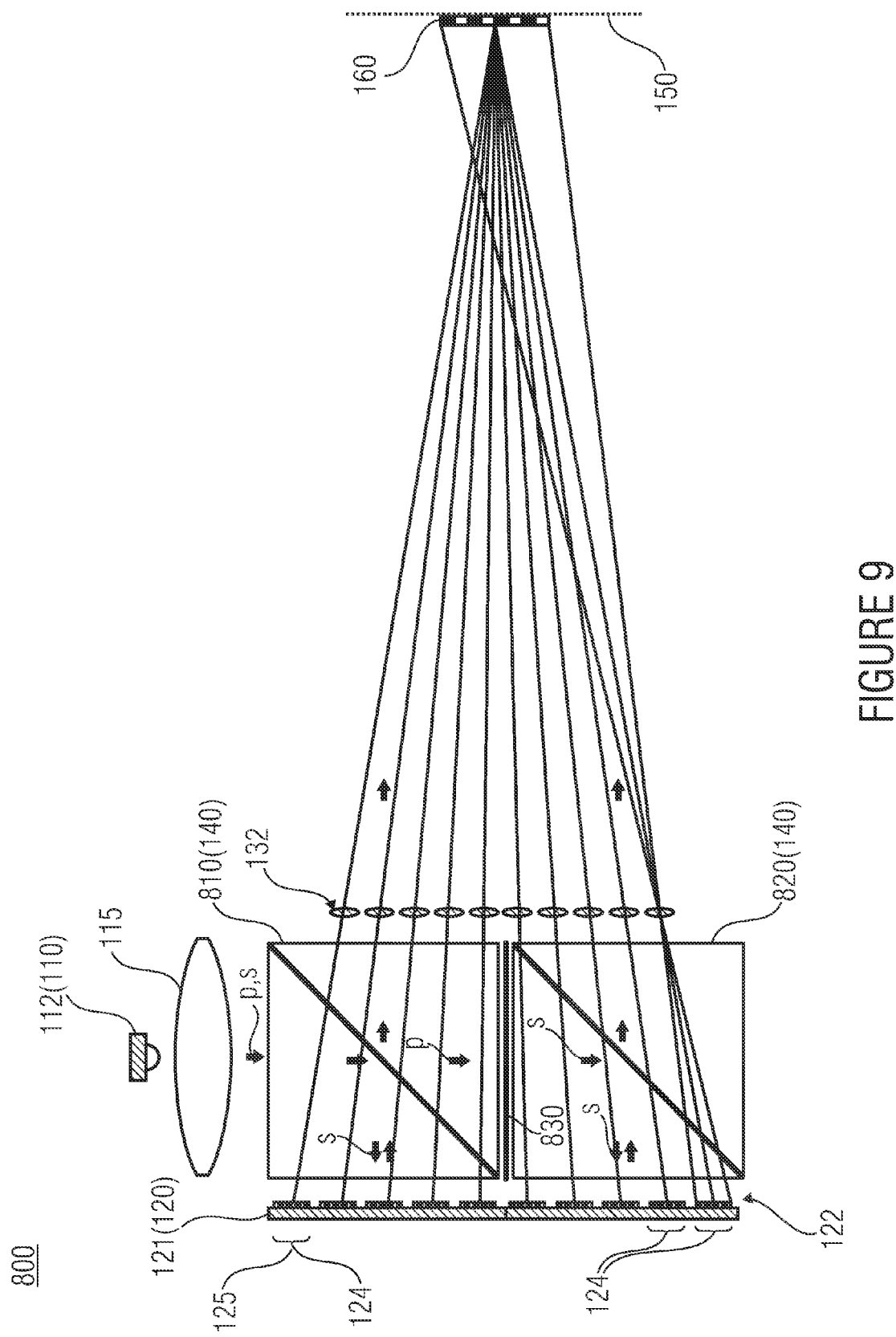
FIG. 9 is a side view of a projection display having two beam splitters and opposing light sources for illuminating a reflective imaging system from two sides.

FIG. 9 shows a side view of a projection display 800 having two beam splitters 810, 820 and a half-wave plate 830 lying between them in the illuminating path. Apart from a first beam splitter 810, the projection display of FIG. 9 particularly comprises a second beam splitter 820 which is arranged, on the one hand, in the optical path between reflective imaging system 120 and two-dimensional assembly 132 of projection optics, and, on the other hand, in the optical path between light source 110 and reflective imaging system 120, and a half-wave plate 830 arranged between the first beam splitter 810 and the second beam splitter 820. Thereby, a polarization direction of a polarization component (e.g. p) transmitted by the first beam splitter 810 of light (polarization components p, s) emitted by the light source 110 can be rotated by 90° when passing the half-wave plate 830. Here, the first beam splitter 810 and the second beam splitter 820 are implement to reflect light from a direction of the light source 110 in the direction of the imaging system 120 by the polarization direction (e.g. s) rotated by 90°. An exemplary illuminating path with the respective polarization component is illustrated in FIG. 9 by arrows indicated by s, p.

In other words, if two polarizing beam splitters are used, as is exemplarily shown in FIG. 9, which are connected in series via the half-wave plate 830 or λ/2 plate in the illuminating path, both polarization components (p, s) of an unpolarized light source, such as an LED, can be used. Here, the half-wave plate rotates the polarization component (p) transmitted unused by the first beam splitter by 90°, so that the same is reflected in the following beam splitter onto the allocated half of the imaging system with the correct polarization direction (s).

The complete utilization of an unpolarized light source by the described assembly having two polarizing beam splitters or polarization dividers and a half-wave plate (λ/2 plate) can be supplemented by the above-described two-sided illumination allowing further halving of the installation length.

With reference to the above embodiments, a projection of outer edges of the first 730, 810 and the second beam splitter 740, 820 on the reflective imaging system 120 can be formed such that the same does not pass through the sub-areas 124 of the imaging system 120. Thereby, it can be avoided that the outer edges, when projected, have a spurious effect in the overall image.

Figure 10:
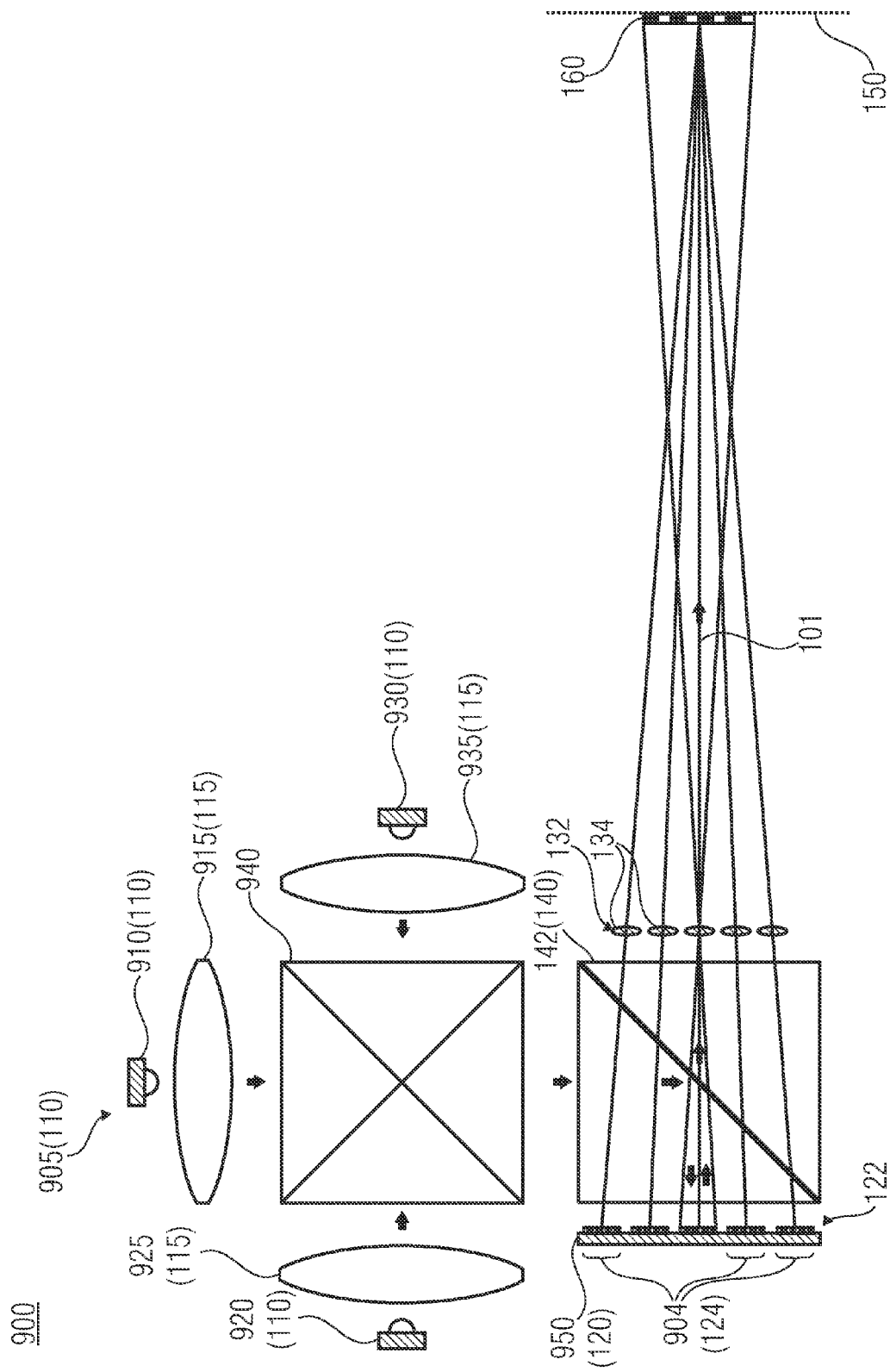
FIG. 10 is a side view of a projection display having a reflective imaging system and an RGB light source synchronized in a color-sequential manner.

In further embodiments, the projection of a full-color RGB image, as is illustrated exemplarily in FIG. 10, can be realized by an RGB light source 905. This is possible, for example, by three LEDs 910, 920, 930 with allocated collimation optics 915, 925, 935 and a color combiner 940. Here, the RGB light source 905 in the embodiment in FIG. 10 essentially corresponds to the light source 110 of the previous embodiments. In particular, in the embodiment shown in FIG. 10, the RGB light source 905 and the imaging system 950 operate in a synchronized, color-sequential manner to obtain full-color projection.

In FIG. 10, the reflective imaging system 950 essentially corresponding to the imaging system 120 of the above embodiments can be implemented to represent identical individual images 904 of the sub-areas 124 of the imaging system 950 with a sufficiently high frame rate. Further, the light source 905 can be implemented to pass sequentially different color components (e.g. red, green, blue) per frame. Via the color-sequential mode of operation of the imaging system 950 and the individual light sources 910, 920, 930, full-color projection can be realized, wherein the image contents, for example of the digital imaging system, is identical for all projection channels.

In further embodiments, the light source 110, the beam splitter 140, the projection optics assembly 130 and the reflective imaging system 120 can be implemented such that reflected light from at least two sub-areas of the imaging system 120 comprises the same color spectrum.

Further, in other embodiments, the light source 110 can be arranged such that different sub-areas of the imaging system 120 are illuminated by different color components. With reference to FIG. 8, for example the first light source 710 can emit light with a first color component, which is reflected by the first beam splitter 730 to the first sub-area 750 of the imaging system 120 after passing through the condenser optics 715, while the second light source 720 can emit light with a second color component, which is reflected by the second beam splitter 740 to the second sub-area 760 of the imaging system 120 after passing through the condenser optics 725. Thus, different sub-areas 750, 760 of the imaging system 120 can be illuminated with the first and second color component which can differ from one another.

Figure 11:
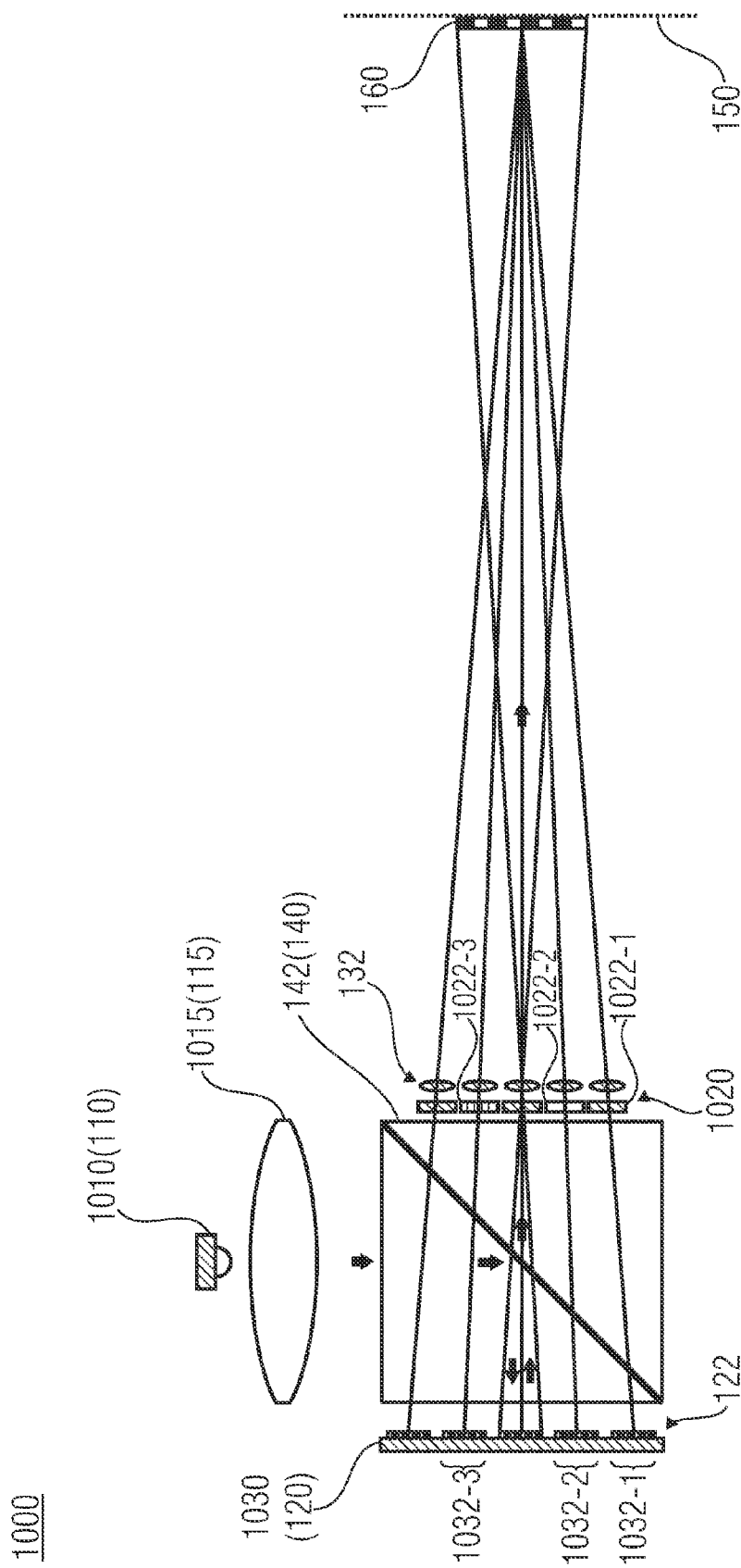
FIG. 11 is a side view of a projection display having a filter assembly for generating color mixing.

FIG. 11 shows a side view of a projection display 1000 with a color filter assembly 1020 for generating a color mix in the projection surface 150. In FIG. 11, the imaging system 1030 essentially corresponding to the imaging system 120 of the previous embodiments is implemented to display groups 1032-1, 1032-2, 1032-3 of individual images each representing a gray scale of a color component of an image content. Here, a respective color filter 1022-1, 1022-2, 1022-3 of the filter assembly 1020 can be allocated to each group 1032-1, 1032-2, 1032-3 of individual images. In this way, the groups 1032-1, 1032-2, 1032-3 of individual images can be filtered according to the respective color component, so that a color mix is presented in the overall image 160 superimposed in the projection surface 150.

In other words, FIG. 11 presents another option for generating RGB images. By illuminating with a white light source 1010 and inserting RGB color filters 1022-1, 1022-2, 1022-3 into the mapping light path, a basic color image is generated in each of a number of projection channels. Normally, one projection channel corresponds to the mapping of a sub-area of the imaging system by an allocated projection optics onto the projection surface. Allocating the respective basic color image contents to the respective projection channels results in RGB projection. An advantage with this type of color generation is the option of white balance by a number of projection channels for the respective basic color adjusted to the spectral characteristic of the light source and the color filters.

In further embodiments, a separate light source of a basic color can be allocated to each projecting channel or a group of projection optics. Color mixing is performed during superposition into the overall image on the screen or in the virtual image.

With reference to FIG. 8, the light source 110 in the projection system 700 is, for example, implemented in the form of light sources 710, 720 to illuminate the different groups 750, 760 of sub-areas of the imaging system 120 with a different color spectrum via the beam splitters 730, 740. Here, within the two-dimensional assembly of projection optics, projection optics 755, 765 which map sub-areas 750, 760 illuminated with different color spectra (e.g. red, blue) by the light sources 710, 720 differ from one another.

Further, in further embodiments, the imaging system 120 can be implemented such that a size of sub-areas 750 that can be illuminated with a first color spectrum of the different color spectra (e.g. red) differs from a size of sub-areas 760 that can be illuminated with a second color spectrum (e.g. blue) different to the first one. Thereby, a size of the individual images in the projection surface can be synchronized.

Here, it should be noted that the display of the color apart from the above-stated direct color illumination of the sub-areas can also be realized by the color filter assembly exemplarily shown in FIG. 11, so that different groups of sub-areas contribute to the overall image with different color spectra.

In further embodiments, the same focal length can be selected for all projection optics within the two-dimensional assembly of projection optics for all different color channels, i.e. for optical channels allocated to different color spectra, so that the same magnification results for all different color channels. If, further, different geometric distances of the projection optics to the imaging system are adjusted, different optical path lengths due to a dispersion of the beam splitter (e.g. the first or second beam splitters 730, 740) can be compensated for the different color channels.

However, in further embodiments, it might be undesirable to arrange the projection optics within the two-dimensional assembly of projection optics at different installation heights. Thus, it can be advantageous to maintain the projection optics at the same geometric distance to the imaging system. In this case, the different optical path lengths due to the dispersion of the beam splitter can be compensated in that different focal lengths of the projection optics are selected according to the different optical path lengths for the different color channels. Here, the different focal lengths have the effect that different magnifications result for the different color channels in the projection surface. The respective magnification or the respective mapping dimension can, however, be adapted again by different sizes of the sub-areas allocated to the different color channels, such as by software (i.e. computer-controlled).

Further, in other embodiments, the beam splitter might not be implemented in the shape of a cube but as a plate, so that a difference between the different optical path lengths due to smaller dispersion is negligible.

Thus, in further embodiments of the invention, by adaptation of the focal lengths of the projection optics of the basic color array per color group, correction of the longitudinal color aberrations of the mapping can be performed. Further, by adaptation of the sub-image sizes of the basic color sub-images per color group, correction of the lateral color aberration of the mapping can be performed. A further advantage of the present invention is hence the possibility of aberration correction in the form of correction of color aberrations, such as longitudinal color aberrations, of the projection optics per channel. If different mapping dimensions for the basic colors exist, correction of the resulting lateral color aberration in the overall image is, for example, also possible by different image sizes of the basic color sub-images.

In further embodiments, by pre-distorting the sub-images, correction of the distortion can be performed. Further, in other embodiments, correction of defocusing of projection channels remote from the axis can be performed by a focal length of the projection optics adapted per channel.

In further embodiments, a projection display can also be characterized in that a correction of the different mapping dimensions of central channels or channels remote from the axis resulting from a focal length adaptation is performed by a size and pre-distortion of sub-images remote from the axis amended per channel. Further, in other embodiments, correction of astigmatism and coma can be performed with different sagittal and tangential focal lengths of projection optics remote from the axis adapted per channel.

Similarly to achromatization, correction of monochromic aberrations per channel, such as the influence of image field curvature for larger object distances of projection channels remote from the axis or the distortion, together with pre-distortions of the sub-images depending on the axis distance of the projection optics, allows simple solutions for improving image quality. While in color correction a differentiation is primarily made between the three color groups and hence three different, corrected projection optics result, the correction of monochromic aberrations generally necessitates an adaptation of the respective projection optics depending on the position of the respective projection channel relative to the array center. Here, for example, lens arrays having focal lengths varying continuously across the array, in elliptic microlenses also divided into sagittal and meridional focal lengths, are useful for correcting astigmatism and coma.

A further option for generating color images is the use of an array light source, such as is shown, for example, in FIG. 6 in the form of the light source 510 having the respective condenser optics assembly 515, for example with LEDs of different light colors. The unique allocation of the individual light sources to groups of sub-images and projection optics is accomplished advantageously by using a field lens array, as is exemplarily shown in FIG. 6. Here, the omission of color filters allows a higher system transmission as compared to the above-described approach.

In further embodiments, the reflective imaging system 120 and the projection optics assembly 130 can be implemented such that identical individual images from different sub-areas are superimposed in a pixel-precise manner.

Further, the imaging system 120 or the imaging system array can be implemented to display different individual images. Their mapping by the allocated projection optics results in the overall image or projection image.

Figure 12:
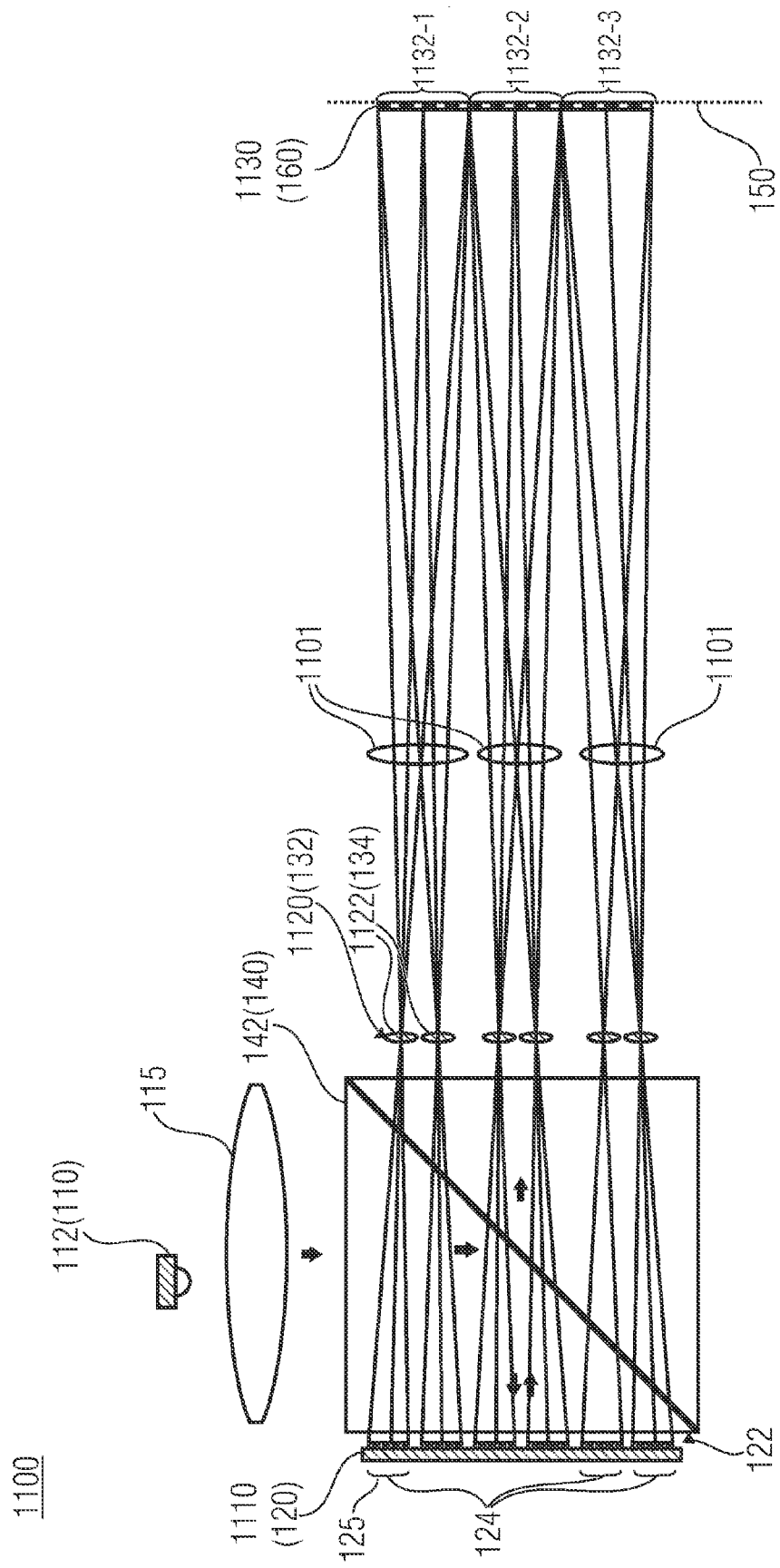
FIG. 12 is a side view of a projection display wherein mappings of individual images are superimposed to an overall image having a higher resolution.

FIG. 12 shows a projection display 1100, where mappings of individual images are superimposed in the projection surface 150 to an overall image 1130 having a higher resolution or displayed number of pixels. In particular, in the embodiment shown in FIG. 12, the reflected imaging system 1110 and the projection optics assembly 1120 can be implemented such that the mappings of the individual images are superimposed in the projection surface 150 with a sub-pixel offset. Here, the projection optics 1122 has, in the two-dimensional assembly 1120, decentration with respect to the allocated sub-areas 124 shown exemplarily in FIG. 12. This results, as is exemplarily shown in FIG. 12, in an overall image 1130 superimposed in the projection surface 150 which has a higher resolution or displayed number of pixels than the individual images.

Apart from full-color projection, the use of different sub-images allows further realization variations. In particular, by joining sub-images, for example according to FIG. 12, a magnification of the resulting overall image 1130, an increase in the number of pixels in the resulting overall image or a combination of both is enabled. In the case illustrated exemplarily in FIG. 11, the overall image 1130 is composed of three joined projected sub-images 1132-1, 1132-2, 1132-3, each mapped via two projection channels 1101.

Figure 13:
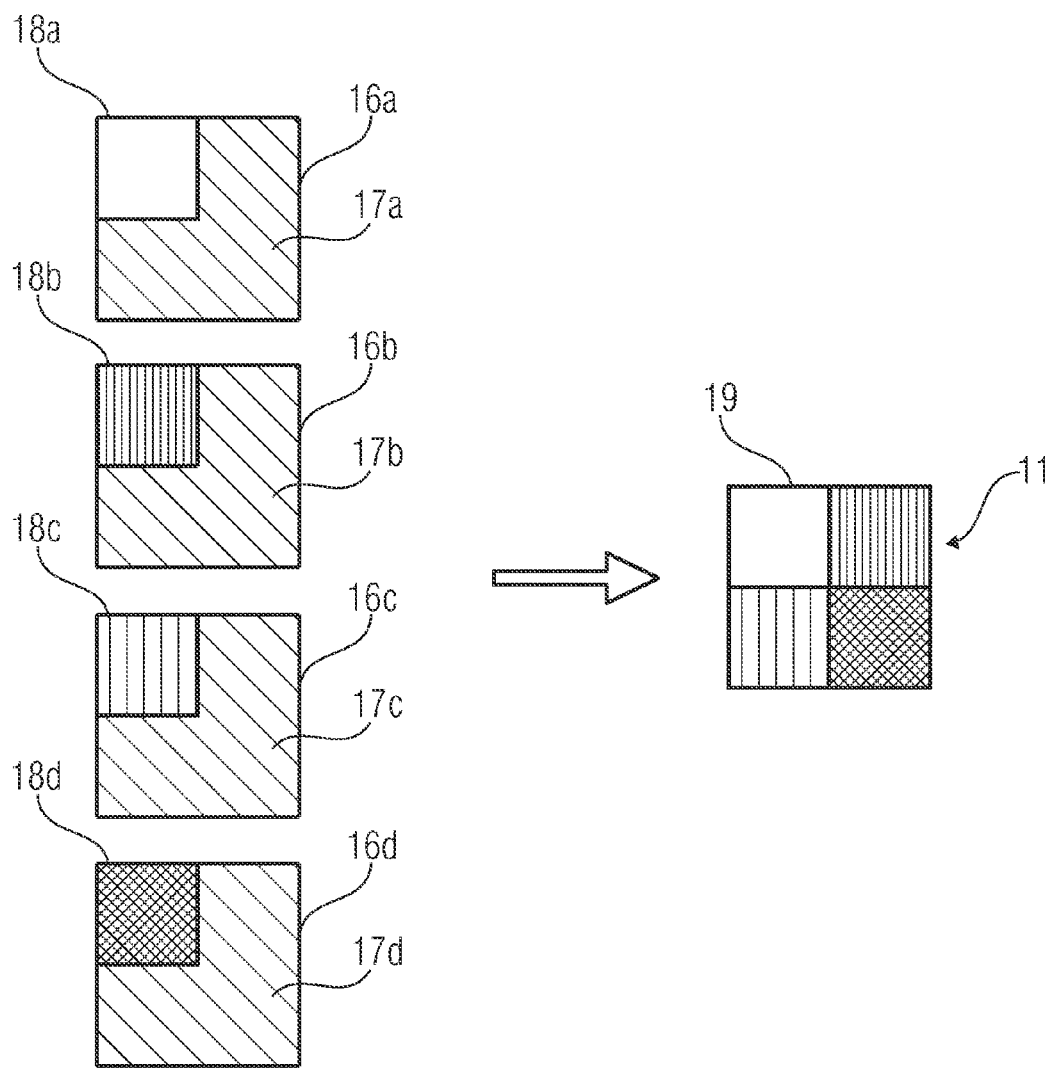
FIG. 13 is a schematic illustration for illustrating superimposing of pixels to an overall image.

FIG. 13 shows a schematic illustration for illustrating a superposition 1200 of pixels to an overall image 19. The realization illustrated in FIG. 13 is particularly advantageous for imaging systems having a low pixel fill factor. A pixel 16a, 16b, 16c or 16d of the imaging system is generally composed of an inactive area 17a, 17b, 17c or 17d and an active area 18a, 18b, 18c or 18d. For the following description, it is assumed that pixel 16a is controlled white, pixel 16b light gray, pixel 16c dark gray and pixel 16d black. If four groups (a, b, c, d) of projection channels are formed, each including pixels 16a, 16b, 16c or 16d in their sub-images at the same respective position, projecting the pixel sub-area or active area 18a, 18b, 18c and 18d in a clearly resolved manner and comprising a decentration of the projection optics which allows projection to the overall image offset by half a pixel pitch (sub-pixel offset), a pixel pattern 11 is obtained at the allocated pixel position in the overall image 19 which represents the superposition of the four sub-images. The described assembly hence allows a number of pixels in the overall image which is higher by the factor 4 with respect to the sub-images.

Figure 14:
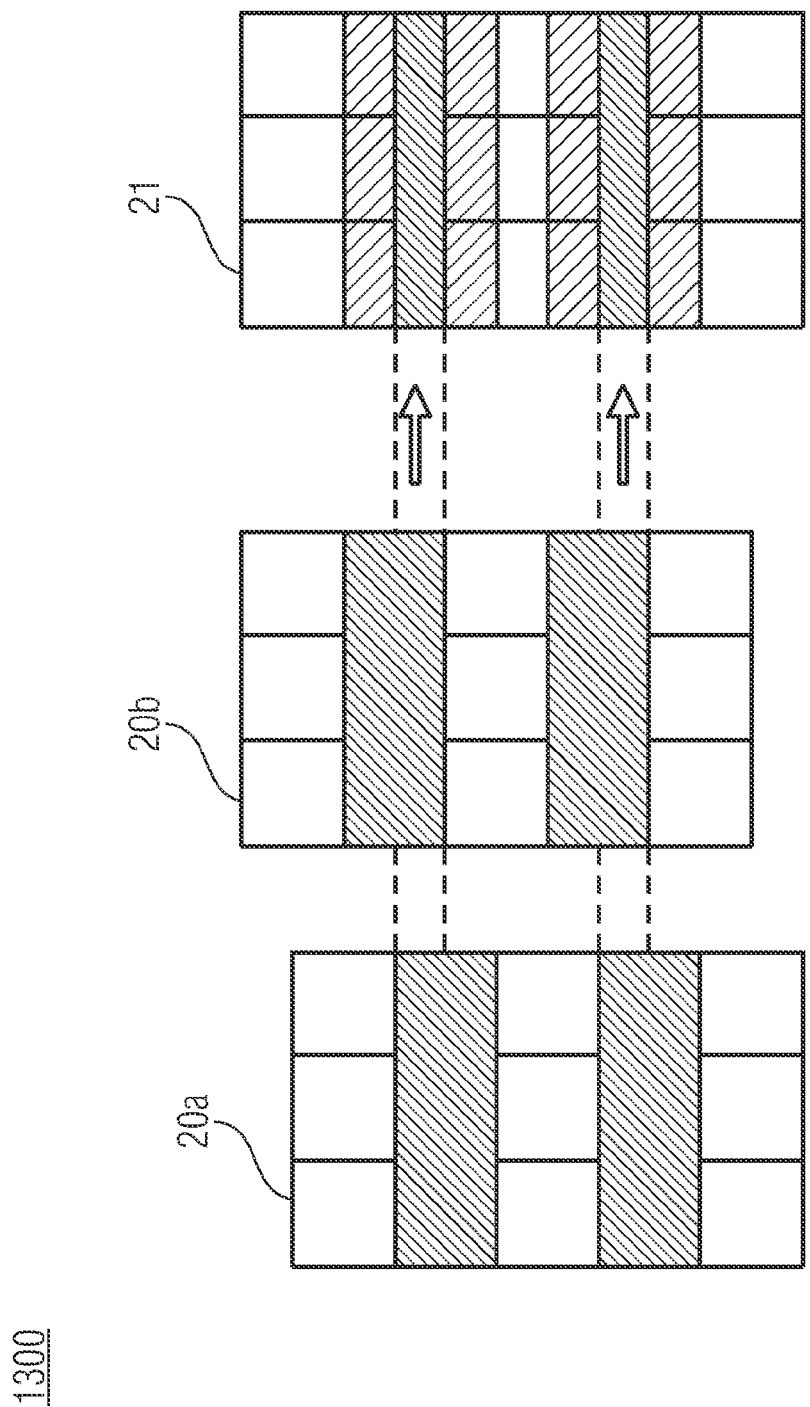
FIG. 14 is a schematic illustration for illustrating superimposing of binary black-and-white sub-images to an overall image.

FIG. 14 shows a schematic illustration for illustrating a superposition 1300 of binary black-and-white sub-images to an overall image 21. If the imaging system has a high fill factor, the superposition with sub-pixel offset in the overall image 21 will result in a combination of an increased number of gray scales and an increase in the number of displayable pixels. These circumstances are illustrated in FIG. 14 based on the example of a strip structure. The purely binary black-and-white sub-images 20a, 20b are superimposed to an overall image 21 having an increased number of gray scales and an increased displayable number of pixels.

Figure 15:
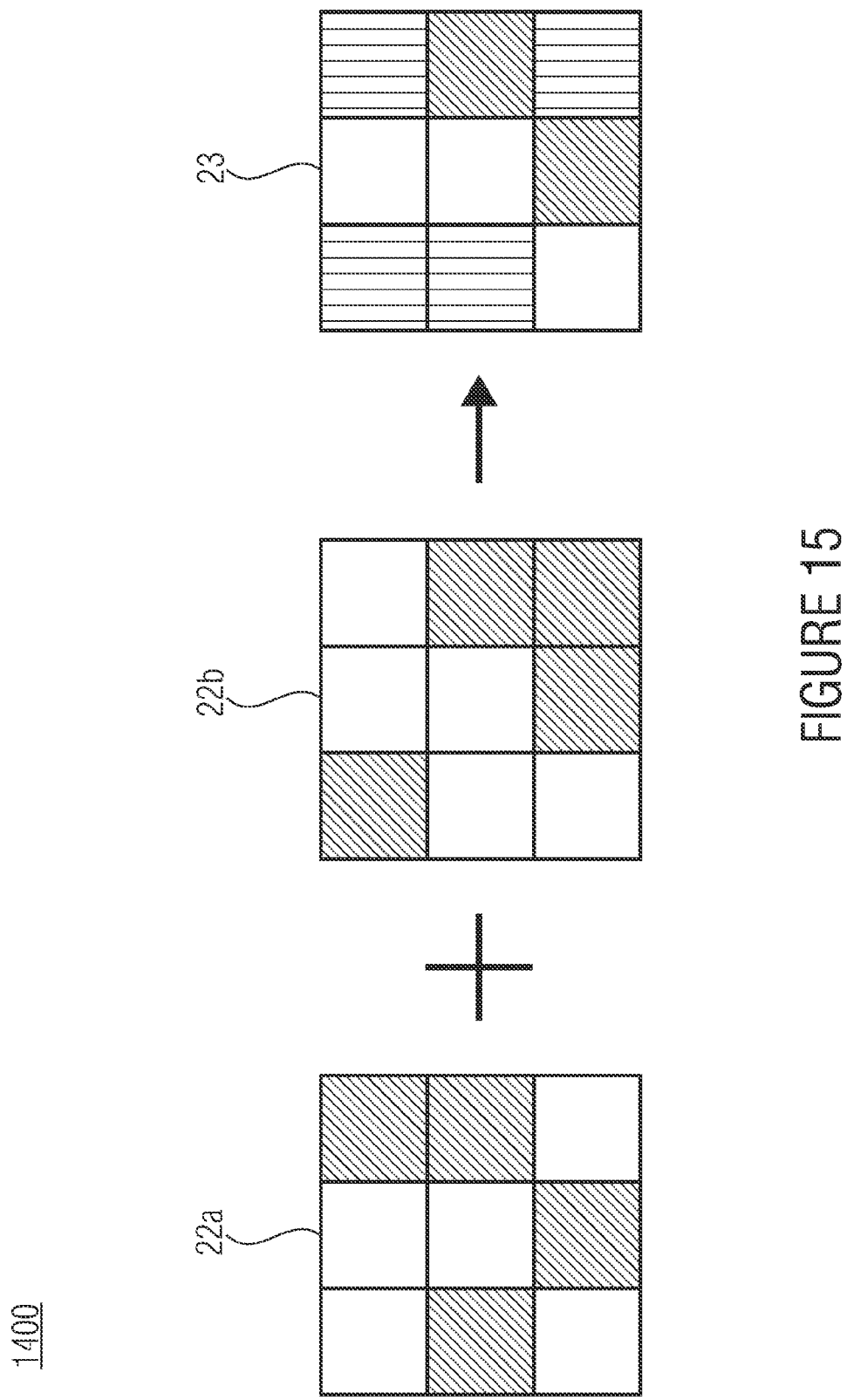
FIG. 15 is a schematic illustration for illustrating further superimposing of binary black-and-white sub-images to an overall image.

Apart from increasing the number of pixels, increasing the number of displayed gray stages without an image offset is also possible. FIG. 15 shows a schematic illustration for illustrating a further inventive superposition 1400 of binary black-and-while sub-images to an overall image 23. FIG. 14 exemplarily shows purely binary black-and-white sub-images 22a, 22b, whose superposition to the overall image 23 already provides three gray scales. A further increase in the different binary images increases the number of displayable gray scales even further. This approach for increasing the number of gray scales can also be used for not purely binary but generally for sub-images having less gray scales. The combination of this approach with the above described procedure for displaying full-color images accordingly allows an increase in color depth.

Thus, with reference to FIGS. 14, 15 the projection display can be implemented to receive an image to be projected having a first gray/color scale resolution, wherein the reflective imaging system 120 is implemented to display the individual images (i.e. the binary black-and-white sub-images 20a, 20b; 22a, 22b) having a second gray/color scale resolution that is smaller than the first gray/color scale resolution. In particular, the projection display can be implemented to control the sub-images depending on a gray/color scale value of the image to be projected at a pixel of the image to be projected such that the individual images in the overall image 21; 23 sum up to a gray/color scale corresponding to the gray/color scale value at a position corresponding to the pixel.

Now that possible details for apparatus implementations of the projection display of FIG. 1 have been described above according to a reflective variation similar to FIG. 2d for different embodiments, it should be noted that some of the variations described with respect to these FIGS. 3-15 can obviously also be applied to the other general implementations according to FIGS. 2a-2c. This applies in particular with respect to the different options of realizing a colored overall image 160. For realizing a colored overall image 160, the imaging system 120 can, for example, be a digital imaging system with pixels of different color channels that are arranged, for example, according to a Bayer pattern. This applies in particular for self-luminous imaging systems 120 according to FIG. 2c. It would also be possible to combine a white light source 110 with different color filters in the channels of the multi-channel optics 134, wherein the filter could not only lie behind the imaging system 120 in the optical path seen from the light source 110, but also in front of the same. The considerations with respect to the mapping corrections of the individual projection optics, such as for taking the respective axis distance of the respective mapping channel to the optical main axis of the projection display into account, apply accordingly to the implementations according to FIGS. 2a-2c, wherein, however, consideration of the dispersion by the beam splitter 140 can be omitted in the embodiments according to FIGS. 2a-2c. The above considerations also apply with respect to the basic option of adding an overall lens in addition to the multi-channel optics. Thus, the multi-channel optics 130 can comprise an overall lens, similar to 310, 312, downstream with respect to the two-dimensional assembly 132 of projection optics and cooperating with the two-dimensional assembly 130 of projection optics 134, which is implemented to refocus collimated beams 315 from the projection optics 134 in a focal plane of the overall lens 310, 312, wherein the projection optics 130 are then centered with respect to the allocated sub-areas 124 and act in a collimating manner, or to focus divergent/convergent beams from the projection optics 134 in an effective focal plane resulting from decentration between the projection optics 134 on the one hand and the sub-areas 124 on the other hand and focusing by the downstream overall lens.

With respect to the field lens 115, it should be noted that the same can be implemented in the form of a Fresnel lens to reduce the installation height. The mentioned light source and a possible collimation optics can be implemented in a multi-channel manner to reduce the structural length, and thus a illumination with R, G or B per channel can be performed in order to generate an RGB image on the screen.

After these explanations with respect to details of the apparatus structure according to some embodiments, reference will again be specifically made below to the measures taken according to embodiments in order to compensate deviations of the projection surface from a plane-parallel orientation to the imaging plane 129. In the following, these circumstances will be considered in more detail than in the description above.

As has become clear from the above description, the multi-channel projection principle allows, by means of multi-channel optics 130, to obtain an increased depth of focus of the individual channels. Thus, it is basically no problem for the individual channels when the projection surface 150 has a laterally variable distance to the projection display. Rather, it is obvious from the above description that the assembly of the sub-areas 124 of the imaging system 120 takes over the adjustment of the depth of focus. Generally, there is a dependence of the projection distance on the difference of the center pitches of the projection optics of the multi-channel optics 130 and the corresponding sub-areas 124 in the imaging plane 129. As has been described above, the depth of focus adaptation to the lateral variation of the depth of the projection surface 150 is realized in that the object structures or individual images within the sub-areas 124 differ from one another by defined deformation in dependence on their position to the center of the distribution of sub-areas 124, i.e. in dependence on their distance to the interface of the optical axis of the projection display 100 with the imaging plane 129. By its distance to the corresponding point in the individual images of the adjacent projection channels (pitch distance), an exactly determined projection distance is allocated to each point within an object structure or an individual image, which takes place, according to the above embodiments, such that the same coincides with the projection distance to that point in the projection surface 150 to which the respective point is mapped by the multi-channel optics 130.

Figure 16:
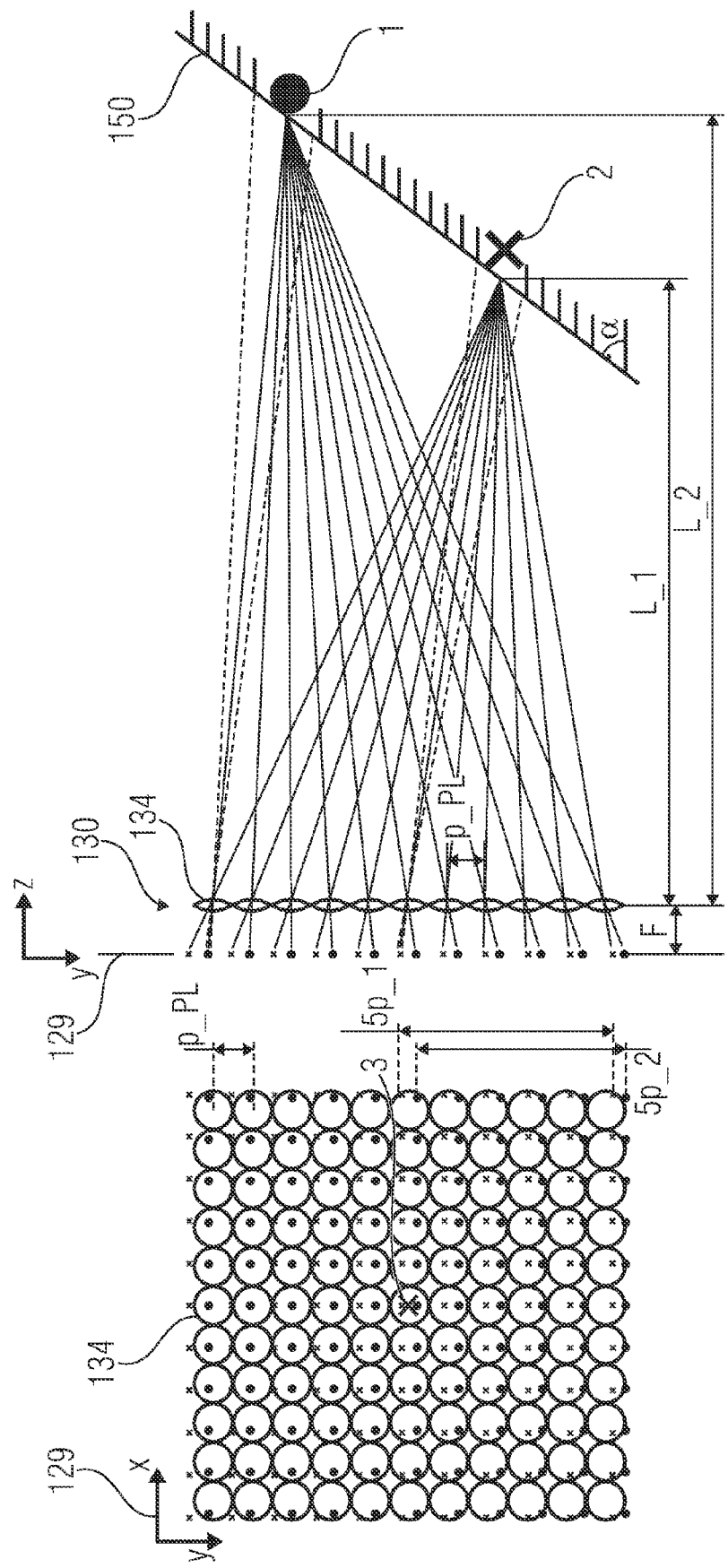
FIG. 16 is a schematic illustration of a projection onto a 40° tilted projection surface having a projection display according to an embodiment.

FIG. 16 exemplarily shows a projection onto a plane tilted exemplarily by 40° to the normal position around the x axis. In particular, FIG. 16 shows on the left a projection along the z axis, illustrating here exemplarily the optical axis of the projection display, onto the imaging plane 12; here, it can be seen that exemplarily regular arrays of projection optics 134 are arranged in rows and columns. As mentioned, the assembly is only exemplary. Apart from that, on the right in FIG. 16 the assembly of imaging plane 129, multi-channel optics 130 and projection surface 150 is shown in cross-section. In the projection surface 150, two points in the overall image are highlighted exemplarily, wherein one is marked by a circle 1 and the other with a cross 2. In the following embodiments, the allocated parameters of these points will be marked with the respective reference number as index. In the cross-section on the right in FIG. 16 it is shown which points in the imaging plane 129 the points in the projection plane 150 correspond to in the shown cross-section plane or in the channels allocated to this cross-section plane. In the left projection mapping, i.e. the top view, the corresponding points in the imaging plane 129 are also illustrated for the other channels. Here, the projection display of FIG. 16 exemplarily consists of 11×11 project channels arranged in a square manner, but neither the type of the assembly nor the number of channels is in any way limiting.

Thus, according to the example of FIG. 16, the image to be projected consists, exemplarily of a cross 2 and a circle 1, corresponding to image points having a different position in the sub-areas of the imaging plane 129. In the exemplary case of FIG. 16, these are 11×11=121 corresponding points per projection point 1 or 2. Together, they form a constellation defined, for example, by the mutual distances of the participating points in the plane 129 to each other.

Starting from the tilt angle α of the projection surface 150, due to the opening angle of the projection optics, a minimum or maximum projection distance ($L_1$, $L_2$) results, which can be calculated into two corresponding pitch distances ($p_1$, $p_2$) of these object points by $$p_{1,2} = \frac{F \cdot p_{pL}}{L_{1,2}} + p_{pL}$$

In the shown example, due to the orientation of the projection surface 150: $L_1 < L_2$ and $p_1 > p_2$ applies. Starting from the array center 3, arrays having 11×11 individual images each are generated for these two exemplary image points, whose object contents vary due to the pitch distance difference across the 11×11 channels. In an image filling the whole sub-area surface, this corresponds to a deformation of the individual images in the sub-areas 124 defined per channel corresponding to an above imaging specification.

Concerning the above-mentioned constellations of points in the plane 129, this means that these spatial constellations of points in the sub-images, each superimposed by the multi-channel optics in a respective common point 1 or 2 in the overall image, differ from one another regarding their distances between the constellation points depending on what distance the respective common point 1 or 2 in the overall image has to the multi-channel optics 130. With a continuously changing or constant projection surface, this means a continuous local distortion, i.e. extension and/or compression, of the individual images 124 depending on where the corresponding projection point is in the projection plane 150, with an intensity that increases with increasing distance from the interface of the optical axis of the projection display with the plane 129. If the projection surface has discontinuities in the dimension of the depth, it can happen that the local distortions at respective locations in the individual images corresponding to the discontinuity positions result in ambiguities which could be counteracted by appropriate measures, such as by averaging or the like.

In this way, the image to be projected can be mapped to screen surfaces of any shape while maintaining a very good mapping quality across an enlarged distance range, without having to accept a loss of luminosity resulting from too large f-numbers. This allows the high-contrast and bright illustration of projection images with a) very flat projection angles onto plane screen surfaces
b) any angles onto curved screen surfaces or
c) any angles onto free-form screen surfaces An advantage not to be underestimated is the avoidance of tiltings between the object plane in the projection optics as would otherwise be necessitated to fulfill the Scheimpflug principle. This allows a significantly simplified system structure.

Figure 17:
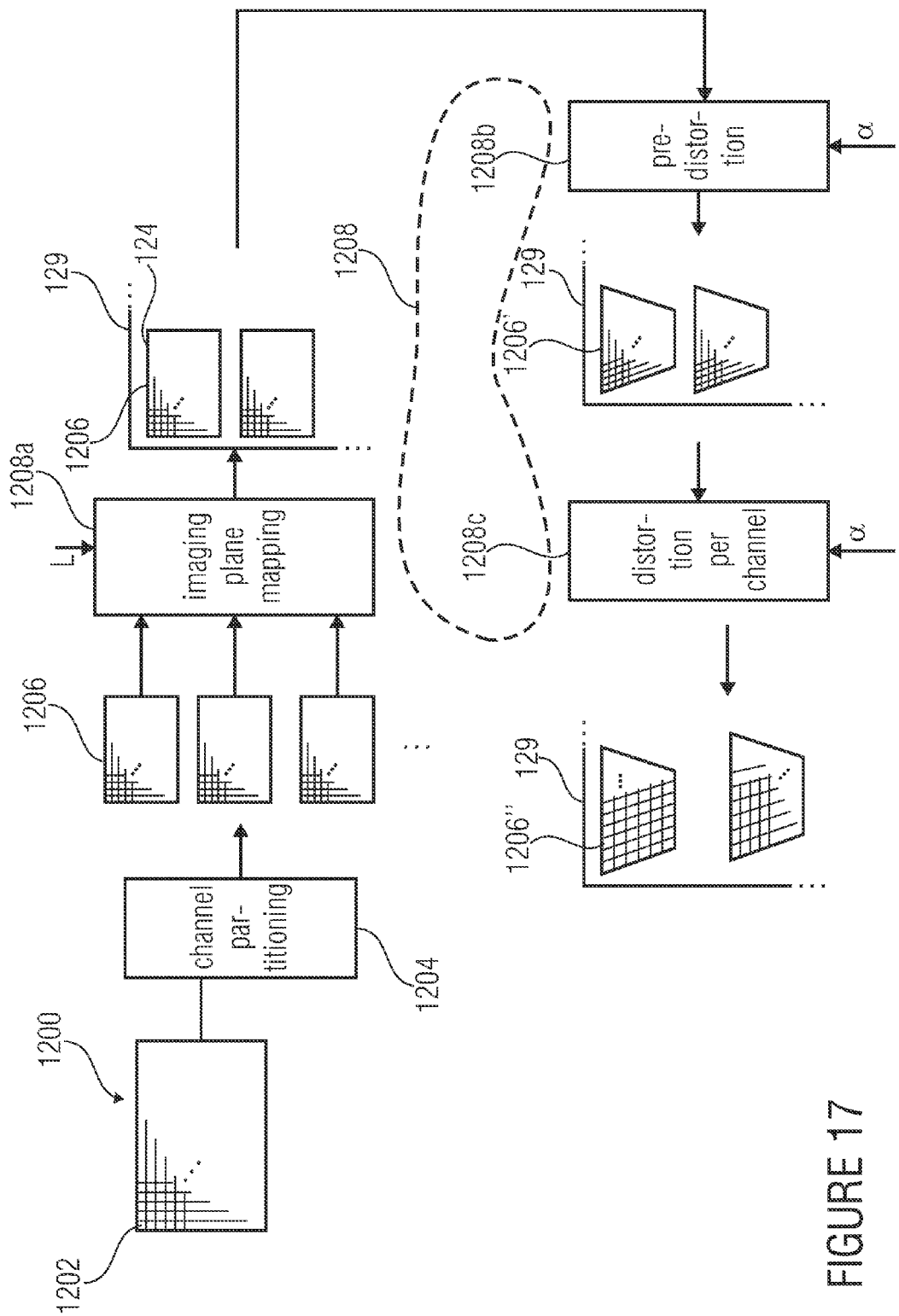
FIG. 17 is a schematic illustration of processing within a digital imaging system according to an embodiment.

In the following, based on FIG. 17, the above-mentioned preprocessing in the imaging system 120 according to an embodiment will be described, wherein the imaging system 120 is a digital imaging system. The starting point of the preprocessing is the incoming image to be displayed in the form of pixel array data 1200. The pixel array data 1200 represent the image to be displayed, for example as a regular array of pixels 1202 or sample values in columns and rows. The sample values 1202 can be color values, grayscale values, black-and-white values or the like. In a first processing step 1204, for example, the pixel data 1200 are used to form output-individual images 1206 for the different channels of the multi-channel optics 130. The channel partitioning 1204 can, as is described above with respect to FIGS. 13, 14 and 15, provide partitioning of the information in the pixel array data 1200 according to color channels, so that, for example, the output-individual images 1206 each correspond to only one color channel of the pixel array data 1200, and/or the channel partitioning 1204 comprises spatial sub-sampling of the pixel array data 1200, etc. The output-individual images 1206 then represent the starting point for the following processing steps. In particular, in a step 1208 the output-individual images of the individual channels are arranged in the imaging plane. This means that the individual images 1206 are distorted and placed in the imaging plane 129 such that the sharp projection of the image 1200 results in an undistorted form in the projection surface 150 by the multi-channel optics 130. As is shown in FIG. 17, step 1208 can be virtually or actually divided into three sub-steps.

In a first sub-step 1208a, the output-individual images 1206 are, for example, at first in the imaging plane 129, arranged with respect to each other for example only by translatory shifting such that they are arranged with respect to the individual channels of the multi-channel optics 130 as described above, with the difference between the center pitch of the individual images 1206 in the imaging plane 129 on the one hand and the channel distance of the multi-channel optics 130 on the other hand also described above, so that adaptation to an average projection distance L can be performed or the average single image distance is adjusted depending on the latter. After step 1208a, the individual images 1206 would, for example, be superimposed accurately or sharply for example in a plane-parallel area at the average projection distance L, if optical inaccuracies caused, for example, by the above-mentioned mapping errors of the multi-channel optics or by the different telecenters of the individual channels are ignored.

In a following step 1208b, the individual images 1206 are subjected to pre-distortion in the sub-areas 124 in the imaging plane 129, which is, for example, the same for all individual images 1206. This processing could of course also be performed prior to step 1208 and even prior to step 1204. In the case of FIG. 16, for example, the pre-distortion 1208 corrects the trapezoid distortion of the individual images due to tilting with respect to the plane-parallel orientation. In FIG. 17, the pre-distortion of individual images 1206 in the imaging plane 129 is illustrated in an exaggerated manner. Generally, the pre-distortion 1208b deals with correcting the distortions resulting from the fact that the imaging scale by which the individual images 1206 are mapped to the projection surface 150 by the multi-channel optics depends on the distance that the respectively considered location in the projection surface 150 has to the projection display and accordingly varies across the overall image.

After the pre-distortion 1208b, the individual images 1206 in the sub-areas 124 of the imaging plane 129 are then individually distorted per channel in a step 1208c. This step also performs adaptation of the depth of focus to the projection surface 150 deviating from the plane-parallel orientation. If one were to take a look at the result of projecting the individual images 1206' after pre-distortion 1208b, the overall image, i.e. the projected image according to data 1200, would appear undistorted in the projection surface 150, but would only be sharp, for example, at the average projection distance. After channel-by-channel distortion 1208c, the individual images 1206" have been distorted individually for each channel such that they realize the constellation changes of points corresponding to each other in the sub-areas 124 discussed according to FIG. 16 due to the different depths along the optical axis of the projection display in the projection surface 150. Thus, the position of the projection surface 150 or its deviation from the plane-parallel orientation at the average projection distance, such as the angle $\alpha$ of FIG. 16, is an influencing parameter in both steps 1208b and 1208c, in the pre-distortion 1208b in the same way for all channels and in step 1208c individually for each channel.

In addition to that, the distortion 1208c individual for each channel can also implement the distortions per channel also mentioned above that are intended to correct the other deviations existing among the different channels, such as those deviations resulting from the already mentioned different peripheral distances of the channels, i.e. the different distances of the sub-areas 124 to the optical axis of the projection display, from possible individual projection optics errors, and possible deviations due to the different allocation of the sub-areas to different color channels of the projection display, such as red, green and blue, and the associated refraction intensities of the otherwise possibly identical projection optics of the individual channels of the multi-channel optics 130.

With respect to step 1208a, it should be noted that the same possibly considers and addresses the circumstance that the luminosity of the overall image might vary visibly due to the locally varying imaging scale across the projection surface. Thus, the imaging system could be implemented such that, by changing transmissions of corresponding image points within a constellation or by controlling their number, an adaptation of the illuminance within the superimposed image takes place. In other words, the number of contributing image points or contributing channels per constellation could be varied, for example such that this number is lower for projection points in closer regions of the projection surface than for those further away. Contributions from channels remote from the axis would then be omitted, in order to minimize the optical disadvantages of these channels in their effect on the overall image. However, only a luminosity reduction of the constellation points could be applied for constellations whose points lie in closer projection plane regions. This luminosity reduction could also be greater for channels remote from the axis than for channels close to the axis. In other words, the imaging system 120 can be implemented in such a way that for homogenizing the illuminance, the sum of the luminosity of the points of the constellations in the imaging plane 129 are varied across the overall image depending on the distance of the respective common point in the overall image to the multi-channel optics 130 to which the points of the respective constellations are superimposed by the multi-channel optics, by luminosity variation of the points and/or variation of the number of sub-images 124 contributing a respective point to the respective constellation. The luminosity variation of the points and/or the variation of the number of sub-images 124 contributing a respective point to the respective constellation can be such that points of sub-images 124 of channels remote from the axis contribute less to the overall image 160.

It should be noted that the process according to FIG. 17 could also be seen as a process as to how, from a predetermined image, a mask could be generated for the imaging system for generating the individual images in the sub-areas 124. This applies also for the above-mentioned consideration of luminosity leveling. Adaptation of the object image point size per channel across the individual sub-images, in particular in the case of applying the process according to FIG. 17 to mask generation, could be performed in step 1208c in order to counteract the superposition of differently extended image points resulting from possible extensions of the sub-images and hence to avoid blurring.

As has become clear from the above description, the above embodiments could be used to realize a projection onto different projection surfaces 150. Generally, each free-form surface can serve as a projection surface 150. The projection surface 150 could also comprise discontinuity locations.

Further, it should be noted that the projection display could be implemented such that the projection surface 150 is adjustable, such as by user input or automatically, such that the projection surface 150 onto which the projection display maps the image to be projected 1200 in a sharp manner, approximates the actual form of a screen or a wall towards which the projection display is oriented to project the image thereon.

One adjustment option relates, for example, to the average distance L of the projection surface 150 to the projection display, wherein the average projection distance L influences step 1208a. The distance could also be detected by the projection display via a respective distance sensor (not shown). Further, it would be possible that the average projection distance L can be detected via an iterative process in that a known test image is projected with different average projection distances, wherein the result of the projection is then evaluated on the actual screen with respect to sharpness or contrast via a camera (not shown) of the projection display in order to select, as the adjustment to be used, the one which maximizes the latter quality measure.

Another adjustment option could be the adjustment of the tilt angle α. The tilt angle α could be input by the user or could be determined automatically. Automatic determination could provide for different angle adjustments a to be tested and detected and evaluated by the above-mentioned camera in order to use the adjustment with the most balanced contrast across the overall image. The same procedure could be used for the tilt angle around the axis y. Iteratively projecting the test image with different tilt angles could be performed in combination with varying the average projection distance.

A further adjustment option could be the adjustment of a radius of curvature of the projection surface 150 in order to adapt the projection surface 150 in this way to projection surfaces curved away from the projection display or curved in the direction of the projection display. Here, a similar procedure could be used, namely projecting a test image with different radii of curvature and recording a camera image with the previously mentioned optional camera at the respective adjustments for evaluating at which radius of curvature the best projection quality results.

The adjustments could obviously also be performed in a user-controlled manner. For the above-mentioned user adjustment options, for example the keypad of an apparatus could be used, into which the projection display is installed, such as the keyboard of a mobile phone or a laptop or the like.

The imaging system (120) could thus be implemented to allow one or several of the following user adjustment options or automatic adjustment options independent of each other:

a) changing the sub-images such that a change of an average projection distance of the projection surface to the multi-channel optics with a respective translatory shift in the position of the projection surface results, b) changing the sub-images such that a change of tilting of the projection surface with respect to the imaging plane results, c) changing the sub-images such that a change of tilting of the projection surface with respect to the imaging plane results, by simultaneously adapting a trapezoidal distortion correction for compensating the distortion of the overall image in the projection surface due to tilting of the same relative to the imaging plane, d) changing the sub-images such that a change of bending of the projection surface relative to a plane-parallel orientation to the imaging plane results, and e) changing the sub-images such that a change of bending of the projection surface with respect to the imaging plane results, by simultaneously adapting a distortion correction for compensating the distortion of the overall image in the projection surface due to local mapping variations due to the bending of the same relative to the plane-parallel orientation to the imaging plane.

Similar procedures can obviously be used for any projection surface geometries, for example by using a respective parameterization, similar to that discussed above. For example, the center of curvature could be implemented in a laterally shiftable manner. For example, a line grating could be used as a test image. However, different test images could also be used for different adjustment or setting parameters.

Thus, in summary, the above embodiments describe a solution for the problem of front projection of an image across greatly changing projection distances or to tilted, curved surfaces, free-form screen geometries or the like, such that high contrast and sharp mapping can be ensured.

Hereby, the above embodiments are characterized by small installation space, high depth of focus and high luminosity. In particular, no tilted optics is necessitated in the embodiments. Homogenization of the light source such that the light distribution is equally distributed starting from the source to the screen or in the image in the projection, thus preventing vignetting of the image without additional optical components, is possible. Homogenization can here also mean mixing the input distribution of the light source, such as the angle and space variable, of luminosity and color values. Additionally, with the above embodiments, a high depth of focus becomes possible even with a small f-number or a very open aperture. Thus, the above embodiments represent a simple, compact system that can project a sharp, bright image on screen geometries that are tilted or have any shape.

It should again be noted that step 1208c in FIG. 17 changes the individual images in the sub-areas such that they change across the array, starting from the array center, such that a high contrast, sharp projection results at several discrete distances or a continuous distance range. A specific projection distance is allocated to each point within an individual image of a sub-area, which allows sharply focused projection onto tilted and optionally curved surfaces. This is performed by a defined pitch distance of points superimposed on the screen within the distribution of sub-areas. Consequently, positiondependent distortion of individual images or sub-areas or lateral shift of sub-portions of the individual images or sub-areas results.

Concerning the above option that the imaging system can also be a stationary, static mask, it should be noted that the latter could be produced, for example, lithographically. Further, it should be noted that the optical axis of the projection display has mostly been assumed as standing perpendicularly on the imaging plane 129, but this does not have to be the case. Rather, it is possible, for example, for several projection displays according to FIG. 1 to be used together to again form a larger projection display system. The projection displays would project their individual overall images, for example attached to one another, perhaps without overlapping, to a common extended projection surface, in order to result in an even larger overall image when combined. In this case, the optical axes of the projection displays could, for example, converge.

In the above embodiments, the different projection distances have been encoded into the individual images in the projection surface 150. According to the subsequently discussed alternative embodiments, it is also possible for this encoding to be performed via the lenses or projection optics of the multi-channel optics, such as for realizing discrete projection distances. According to such embodiments, each channel does not project the whole image information, which means overall less transmission or luminance, but only that corresponding to the corresponding distance to the screen or projection surface 150. Thus, this is an interleaving of array projectors or channels, wherein each sub-array is allocated to a distance. Here, focusing the optics can also be adapted, such as via focal length adaptation of the individual projection optics across the array, if the optics is within a plane-parallel plane with respect to the imaging system.

According to the embodiments discussed in the previous paragraph, the projection display of FIG. 1 is implemented, in deviation from the above embodiments, for example in the following way, wherein, however, it should be noted that, apart from the deviations, all variation options described above with respect to the above embodiments also apply for the following ones. Thus, according to the alternative embodiments described below, the projection display also comprises the imaging system 120 that is implemented to generate individual images in a distribution of sub-areas 124 of an imaging plane 129 of the imaging system 120, as well as the multi-channel optics 130 that is configured to map one allocated sub-area of the imaging system 120 each per channel, such that the mapping of the individual images is superimposed to an overall image in a projection surface. However, the constellations do not need to have the above-mentioned dependence on the projection distance of the allocated projection image points in the surface 150. The projection surface 150 can again be a non-planar free-form surface or be tilted with respect to the imaging plane, but as a compensation for this and for obtaining the desired projection sharpness, the imaging system 110 and the multi-channel optics 130 are implemented such that an implementation of a contribution of each channel to the overall image varies locally across the overall image depending on what distance the respective common point in the overall image has to the multi-channel optics 130. For example, the imaging system 110 and the multi-channel optics 130 can be implemented such that a number of superimposed channels vary locally across the overall image depending on what distance the respective common point in the overall image has to the multi-channel optics 130.

In particular, it is possible that the imaging system 110 and the multi-channel optics 130 comprise disjunct sets of channels for different projection surface distances. This will be discussed based on FIG. 18, which is similar to FIG. 16 but clearly shows the differences with respect to the above embodiments. According to the alternative embodiment, not all 11×11 channels, i.e. the sub-areas 124 with allocated projection optics are responsible for the overall image. Rather, a first set of channels, here, for example, the bottom 6×11 channels are implemented to limit the superposition to the overall image to a first portion of the overall image which is at a first interval $I_2$ of distances to the multi-channel optics 130. A second set of channels disjunct to the first, here the top half of 5×11 channels, is implemented to limit the superposition to the overall image to a second portion of the overall image which is at a second interval $I_1$ of distances to the multi-channel optics 130 comprising distances that are larger than all distances of the first interval $I_2$. The intervals $I_1$ and $I_2$ are here exemplarily free of overlapping, but this does not have to be the case. In the case of a discontinuous free-form surface having, for example, only two different distance ranges, namely $L_1$ and $L_2$, the intervals do not even have to touch and could be reduced to individual distances. Thus, the individual images in the sub-areas 124 here cover individual, but no longer all portions of the overall image. The individual images in the top sub-areas comprise, among the exemplarily highlighted points 1 and 2, only corresponding points for point 1, since the same lies within interval $I_1$, and the individual images in the bottom sub-areas comprise, among the exemplarily highlighted points 1 and 2, only corresponding points for point 2, since the same lies within interval $I_2$.

In order to focus the individual channel to their respective distance interval, the channels are configured such that constellations of points in the individual images, each superimposed by the first (bottom) set of channels of the multi-channel optics 130 in a respective common point 2 in the respective portion $I_2$ in the overall image 160, result mainly by a centric extension with a first ratio of extension from a constellation of locations where a projection of aperture centers of the channels of this first set is arranged (namely in FIG. 18 the centers of the bottom 6×11 circles), while the constellations of points in the individual images, each superimposed by the second set of channels of the multi-channel optics (130) in a respective common point 1 in the second portion $I_1$ the overall image, mainly result by a centric extension having a second ratio of extension from a constellation of locations where a projection of aperture centers of the channels of the second set is arranged (namely in FIG. 18 the centers of the bottom 6×11 circles), such that the first ratio of extension is higher than the second ratio of extension. This means that, compared to the constellation of the channel projection optics centers of the bottom channels, the constellation of the points corresponding to point 2 is extended further than the constellation of the points corresponding to point 1 with respect to the constellation of the channel projection optics centers of the top channels. This can happen in different ways: by adapting the individual images or sub-areas 124 and/or by providing a different pitch of the channel projection optics centers of the top channels compared to the pitch of the channel projection optics centers of the bottom channels.

The multi-channel optics 130 could be implemented such that the channels of the first set are focused to smaller distances to the multi-channel optics 130 than the channels of the second set. In this way it becomes possible to cover regions of depth of focus that even exceed the optical depth of focus of the individual channels.

Figure 18:
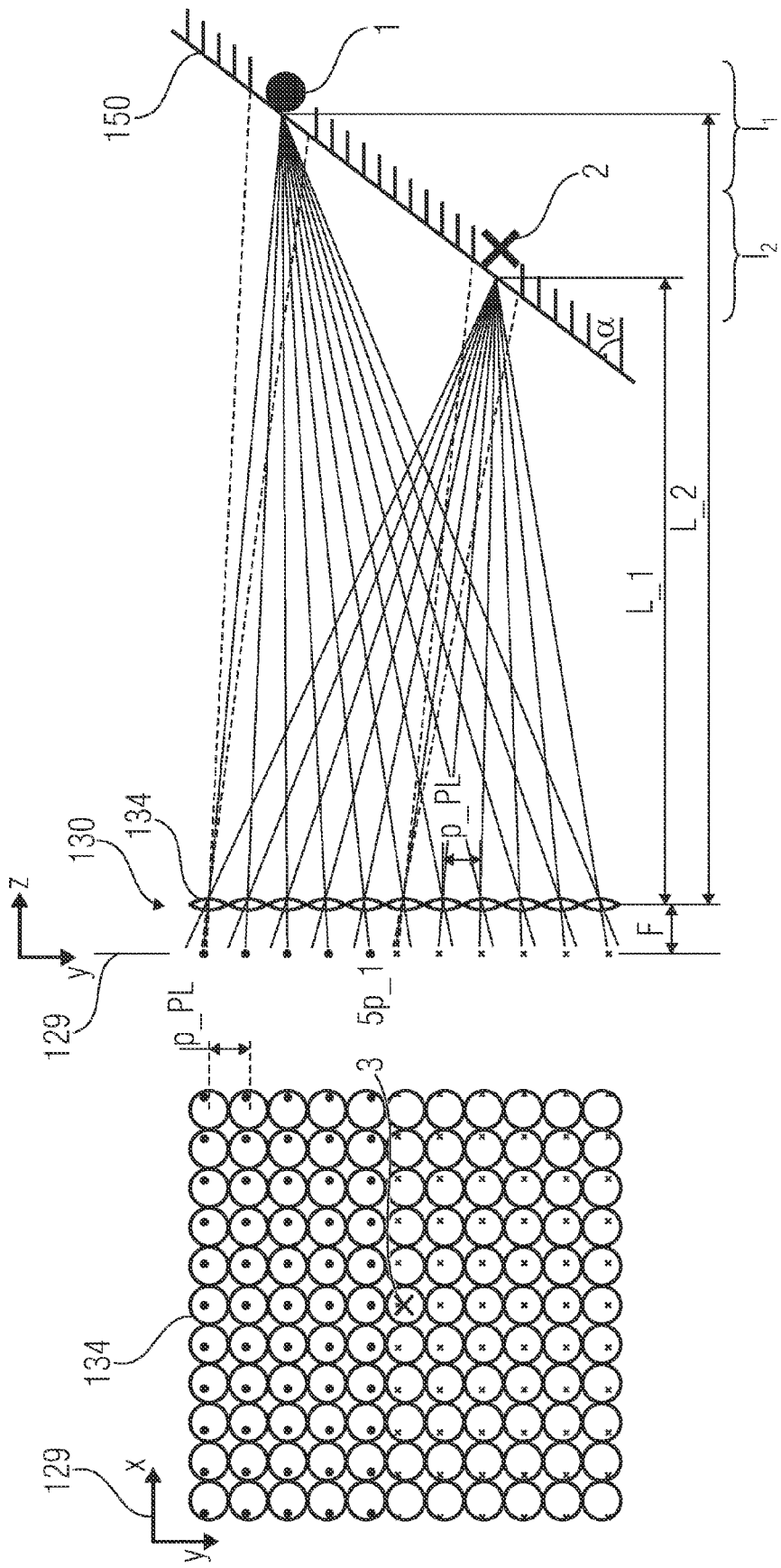
FIG. 18 is a schematic illustration of a projection to a 40° tilted projection surface with a projection display according to a further embodiment.

The above embodiments could now be combined with the variation according to FIG. 18 so that each set of channels is again sharp in its respectively allocated interval across an extended area of distances. In other words, a combination with coding of the projection distance across the objects can be used to further increase image quality. This can be advantageous, for example, for extreme screen geometries if the depth of focus of the individual channels is not sufficient, for example due to large focal lengths or an f-number which is too small to cover the whole distance range, i.e. focusing per channel becomes necessitated. Thus, the imaging system 120 can be implemented such that constellations of points in the individual images, each superimposed by the channels of the first set of the multi-channel optics 130 in a respective common point 1 in the overall image 160, or constellations of points in the individual images superimposed respectively by the channels of the second set of the multi-channel optics 130 in a respective common point 1 in the overall image 160 differ depending on what distance the respective common point 1 or 2 in the overall image has to the multi-channel optics 130.

Here, it should further be noted that coding of the projection distance across the objects 124 does not necessarily have to take place in a continuous manner, but can be realized discretely. Changing the constellations is thus also possible in discrete steps, which significantly simplifies the system, in particular for respective projection subjects. As one example, the image of a keyboard is to be seen as content to be projected, more accurately the projection of a static keyboard at a very flat angle. Here, for each row of letters, such as the F row of keys, the row from 'to =, the row from A to ', the row from Z to M, etc., or for each key a projection distance is calculated and hence only discrete differences of the constellation are introduced. The same can apply for line patterns to be projected or generally for subjects that can be discretized, i.e. that are non-continuous.

Generally, with respect to the above description it should be noted that generally the extension of the projector compared to the projection distance should not be of importance. This means that the distances of the screen alone with respect to the array center can be calculated. However, for extreme cases, a change of distance to the screen per channel can occur, which can then be corrected again per channel.

Possible applications for the above embodiments are in the field of personal communication and entertainment electronics and data visualization at home and in the mobile field. A further field of application is in the field of automobiles and aircraft in the form of a head-up display for projected display of color state information, navigation, environmental information as driver assistance systems or for entertaining passengers. Applications in metrology and medical technology are also possible, as well as in display applications in industrial and production plants. Use of the above projection displays as illuminating units, front headlights, effect illumination, such as for automobiles, is also possible.

Further fields of application are in the realization of projection and illumination systems on tilted and optionally curved surfaces for machine vision, automotive, architecture, home infotainment (e.g. home communication field—kitchen projection), illumination as well as ophthalmological and general medical applications (e.g. illuminating the curved retina).

While some aspects have been described in the context of an apparatus, it is obvious that these aspects also represent a description of the respective method, so that a block or a device of an apparatus can also be seen as a respective method step or as a feature of a method step. Analogously, aspects that have been described in the context of one or as a method step also represent a description of a respective block or detail or feature of a respective apparatus. Some or all of the method steps can be performed by a hardware apparatus (or using a hardware apparatus), such as a microprocessor, a programmable computer or an electronic circuit. In some embodiments, some or several of the most important method steps can be performed by such an apparatus.

Depending on specific implementation requirements, embodiments of the invention can be implemented in hardware or in software. The implementation can be made by using a digital memory medium, for example a floppy disc, a DVD, a Blu-ray disc, a CD, an ROM, a PROM, an EPROM, an EEPROM or a FLASH memory, a hard disc or any other magnetic or optical memory on which electronically readable control signals are stored that can cooperate or cooperate with a programmable computer system such that the respective method is performed. Thus, the digital memory medium can be computer-readable.

Thus, some embodiments according to the invention comprise a data carrier comprising electronically readable control signals that are able to cooperate with a programmable computer system such that one of the methods described herein is performed.

Generally, embodiments of the present invention can be implemented as a computer program product with a program code, wherein the program code is effective to perform one of the methods when the computer program product runs on a computer.

The program code can, for example, be stored on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein when the computer program runs on a computer.

Thus, a further embodiment of the inventive method is a data carrier (or a digital memory medium or a computer-readable medium) on which the computer program for performing one of the methods described herein is recorded.

Thus, a further embodiment of the inventive method is a data stream or a sequence of signals representing the computer program for performing one of the methods described herein. The data stream or the sequence of signals can be configured such that they can be transferred via a data communication connection, for example via the Internet.

A further embodiment comprises a processing means, for example a computer or a programmable logic device configured or adapted to perform one of the methods described herein.

A further embodiment comprises a computer on which the computer program for performing one of the methods described herein is installed.

A further embodiment according to the invention comprises an apparatus or a system implemented to transmit a computer program for performing at least one of the methods described herein to a receiver. The transmission can be made, for example, electronically or optically. The receiver can, for example, be a computer, a mobile device, a memory device or a similar apparatus. The apparatus or the system can, for example, comprise a file server for transmitting the computer program to the receiver.

In some embodiments, a programmable logic device (for example a field-programmable gate array, an FPGA) can be used to perform some or all functionalities of the methods described herein. In some embodiments, a field-programmable gate array can cooperate with a microprocessor to perform one of the methods described herein. Generally, in some embodiments, the methods are performed by means of any hardware apparatus. The same can be a universally usable hardware such as a computer processor (CPU) or hardware specific to the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A projection display comprising
an imaging system that is implemented to generate individual images in a distribution of sub-areas of an imaging plane of the imaging system; and
a multi-channel optics that is configured to map one allocated sub-area of the imaging system each per channel, such that the mapping of the individual images is superimposed to an overall image in a projection surface which is a non-planar free-form surface or tilted with respect to the imaging plane,
wherein
the imaging system is implemented as a fixed mask fixedly forming the individual images at the sub-areas so that the projection surface is located at a fixed position relative to the projection display, with the fixed mask being configured so that the individual images are mutually distorted relative to each other such that
or
the imaging system is implemented as a digital imaging system configured to reproduce versions of an input image to be displayed as the individual images, the imaging system being configured so as to mutually distort the images relative to each other in a fixed manner so that the projection surface is located at a fixed position relative to the projection display, and such that
or
the imaging system is implemented as a digital imaging system configured to reproduce versions of an input image to be displayed as the individual images, the imaging system being configured so as to mutually distort the images relative to each other in a manner adaptive to a relative position of the projection surface relative to the projection display such that
constellations of points in the individual images, each superimposed in a respective common point in the overall image by the multi-channel optics, differ depending on what distance the respective common point in the overall image has to the multi-channel optics.

2. The projection display according to claim 1, wherein the multi-channel optics comprises a two-dimensional assembly of projection optics in a projection optics plane essentially parallel to the imaging plane, wherein the projection optics assembly is configured to map one allocated individual image of the imaging system each along a respective optical axis in the direction of the projection surface, such that the mappings of the individual images are superimposed to the overall image in the projection surface.

3. The projection display according to claim 2, wherein the projection optics comprises decentration with respect to the allocated sub-areas, wherein a center pitch of the projection optics is smaller than a center pitch of the allocated sub-areas, so that the overall image superimposed in the projection surface is real.

4. The projection system according to claim 2, wherein the projection optics comprises decentration with respect to the allocated sub-areas, wherein the center pitch of the projection optics is larger than or equal to the center pitch of the allocated sub-areas, so that the overall image superimposed in the projection surface is virtual.

5. The projection display according to claim 2, wherein the projection optics is centered with respect to the allocated sub-areas and has a collimating effect.

6. The projection display according to claim 3, wherein the projection optics assembly further comprises an overall lens that is downstream with respect to the two-dimensional assembly of projection optics and cooperates with the two-dimensional assembly of projection optics that is implemented to refocus collimated beams from the projection optics in a focal plane of the overall lens, wherein the projection optics are centered with respect to the allocated sub-areas and have a collimating effect, or to focus divergent/convergent beams from the projection optics in an effective focal plane resulting by decentration between the projection optics on the one hand and the sub-areas on the other hand and focusing by the downstream overall lens.

7. The projection display according to claim 6, wherein the overall lens is implemented as optics with variable focal length, so that an average projection distance can be adjusted.

8. The projection display according to claim 7, wherein the optics with variable focal length is a zoom objective or a liquid lens.

9. The projection display according to claim 2, wherein each projection optics comprises a lens vertex decentered with respect to the aperture of the respective projection optics, wherein a center pitch of the lens vertex is larger or smaller than the center pitch of the allocated sub-areas, so that the lenses effect a projection of the individual image of the respective sub-area along optical axes running divergently or convergently.

10. The projection display according to claim 2, wherein a distance between the sub-areas and the respective projection optics essentially corresponds to a focal length of the respective projection optics.

11. The projection display according to claim 2, wherein a distance between the sub-areas and the respective projection optics essentially corresponds to a focal length of the respective projection optics, but such that the projection lenses remote from the axis have a larger focal length for correcting a defocus due to the larger image distance of these channels.

12. The projection display according to claim 1, wherein the imaging system is further implemented such that the constellations additionally differ depending on the solid angle region in which, seen from the multi-channel optics, the respective common point lies, in order to compensate mapping errors of the multi-channel optics.

13. The projection display according to claim 12, wherein the imaging system is further implemented such that the constellations differ additionally depending on the solid angle region in which, seen from the multi-channel optics, the respective common point lies such that mapping errors of the multi-channel optics can be compensated individually for each channel.

14. The projection display according to claim 1, wherein the imaging system is implemented such that the difference between the constellations depending on the distance of the respective common point in the overall image to the multi-channel optics is reflected mainly in a centric extension between the constellations, so that first constellations of points in the individual images, each superimposed by the multi-channel optics in a respective common point in the overall image that is less distant to the multi-channel optics than a respective common point in the overall image where points of second constellations in the individual images are superimposed by the multi-channel optics assembly, are laterally more extended with respect to the second constellations.

15. The projection display according to claim 1, wherein the imaging system is implemented, for homogenizing the illuminance across the overall image, to vary the sum of the luminosities of the points of the constellations in the imaging plane depending on the distance of the respective common point in the overall image to the multi-channel optics to which the points of the respective constellations are superimposed by the multi-channel optics, namely by luminosity variation of the points and/or variation of the number of sub-areas contributing a respective point to the respective constellation.

16. The projection display according to claim 15, wherein the imaging system is implemented such that the luminosity variation of the points and/or the variation of the number of sub-areas contributing a respective point to the respective constellation is such that points of sub-areas of channels remote from the axis contribute less to the overall image.

17. The projection display according to claim 1, wherein the imaging system is implemented to generate the individual images from pixel array data representing the overall image, namely by pre-distorting the pixel array data so that distortion of the overall image in the projection surface is corrected due to tilting the same relative to the imaging plane.

18. The projection display according to claim 1, wherein the image system is a reflective imaging system or a transmissive imaging system with rear illumination or a reflective background or an emissive imaging system.

19. The projection display according to claim 1, wherein the image system is a transmissive imaging system that is implemented to display the individual images by lateral variation of transmissivity, wherein the projection display comprises a light source and a field lens or field lens array, and the field lens is arranged at a distance to the individual images so that Köhler illumination of the multi-channel optics is realized.

20. The projection display according to claim 19, further comprising a further field lens for canceling the telecentric illumination.

21. The projection display according to claim 1, wherein at least part of the imaging system is implemented passively, such as in the form of a finely structured mask.

22. The projection display according to claim 1, wherein the imaging system and the multi-channel optics are implemented such that identical individual images from different sub-areas are superimposed in the projection surface in a pixel-precise manner.

23. The projection display according to claim 1 that is implemented to receive an image to be projected with a first gray/color scale resolution, wherein the imaging system is implemented to display the individual images with a second gray/color scale resolution that is smaller than the first gray/color scale resolution, wherein the projection display is implemented to control the sub-areas at an image point of the image to be projected depending on a gray/color scale value of the image to be projected, such that the individual images in the overall image, at a position corresponding to the image point, sum up to a gray/color scale corresponding to the gray/color scale value.

24. The projection display according to claim 1, wherein the imaging system and the projection optics assembly are implemented such that the mappings of the individual images are superimposed in the projection surface with a sub-pixel offset so that the overall image superimposed in the imaging plane has a higher resolution than the individual images.

25. The projection display according to claim 1, wherein the imaging system allows one or several of the following user adjustment options independent of one another:
   a) changing the sub-images such that a change of an average projection distance of the projection surface to the multi-channel optics with a respective translatory shift in the position of the projection surface results,
   b) changing the sub-images such that a change of tilting of the projection surface with respect to the imaging plane results,
   c) changing the sub-images such that a change of tilting of the projection surface with respect to the imaging plane results, by simultaneously adapting a trapezoidal distortion correction for compensating the distortion of the overall image in the projection surface due to tilting of the same relative to the imaging plane,
   d) changing the sub-images such that a change of bending of the projection surface relative to a plane-parallel orientation to the imaging plane results, and
   e) changing the sub-images such that a change of bending of the projection surface with respect to the imaging plane results, by simultaneously adapting a distortion correction for compensating the distortion of the overall image in the projection surface due to local mapping variations due to the bending of the same relative to the plane-parallel orientation to the imaging plane.

26. The projection display according to claim 1, further comprising a camera and an adjuster, wherein the adjuster is implemented to regulate the projection surface into which the multi-channel optics superimpose the individual images to the overall image, in an iterative process and by controlling the imaging system, so that the same displays a test image, such that the projection surface is approximated to an actual projection surface.

27. A method for displaying an overall image, comprising:
   generating individual images in a distribution of sub-areas of an imaging plane; and
   mapping, by one channel of a multi-channel optics each, one allocated sub-area of the imaging plane each, such that the mapping of the individual images is superimposed to an overall image in a projection surface,
   wherein the projection surface is a non-planar free-form surface or tilted with respect to the imaging plane, and generation of the individual images is performed such that constellations of points in the individual images, each superimposed by the multi-channel optics in a respective common point in the overall image, differ depending on what distance the respective common point in the overall image has to the multi-channel optics.

28. A projection display comprising an imaging system that is implemented to generate individual images in a distribution of sub-areas of an imaging plane of the imaging system; and a multi-channel optics that is configured to map one allocated sub-area of the imaging system each per channel, such that the mapping of the individual images is superimposed to an overall image in a projection surface which is a non-planar free-form surface or tilted with respect to the imaging plane, wherein the imaging system is implemented as a fixed mask fixedly forming the individual images at the sub-areas so that the projection surface is located at a fixed position relative to the projection display, with the fixed mask being configured so that the individual images are mutually distorted relative to each other such that or the imaging system is implemented as a digital imaging system configured to reproduce versions of an input image to be displayed as the individual images, the imaging system being configured so as to mutually distort the images relative to each other in a fixed manner so that the projection surface is located at a fixed position relative to the projection display, and such that or the imaging system is implemented as a digital imaging system configured to reproduce versions of an input image to be displayed as the individual images, the imaging system being configured so as to mutually distort the images relative to each other in a manner adaptive to a relative position of the projection surface relative to the projection display such that a manifestation of a contribution of each channel to the overall image varies locally across the overall image depending on what distance the respective common point in the overall image has to the multi-channel optics.

29. The projection display according to claim 28, wherein the imaging system and the multi-channel optics are implemented such that a number of superimposed channels vary locally across the overall image depending on what distance the respective common point in the overall image has to the multi-channel optics.

30. The projection display according to claim 28, wherein the imaging system and the multi-channel optics are implemented such that a first set of channels is implemented to limit the superposition to an overall image to a first portion of the overall image that is located within a first interval of distances to the multi-channel optics, and a second set of channels disjunct to the first is implemented to limit the superposition to the overall image to a second portion of the overall image that is located within a second interval of distances to the multi-channel optics, comprising distances that are larger than all distances of the first interval, and that constellations of points in the individual images, superimposed respectively by the first set of channels of the multi-channel optics in a respective common point in the first portion in the overall image, result essentially by a centric extension having a first ratio of extension from a constellation of locations where a projection of aperture centers of the channels of the first set is arranged, and constellations of points in the individual images, superimposed respectively by the second set of channels of the multi-channel optics in a respective common point in the second portion in the overall image, result essentially by a centric extension having a second ratio of extension from a constellation of locations where a projection of aperture centers of the channels of the second set is arranged, and wherein the first ratio of extension is larger than the second ratio of extension.

31. The projection display according to claim 30, wherein the multi-channel optics is implemented such that channels of the first set are focused to smaller distances to the multi-channel optics than the channels of the second set.

32. The projection display according to claim 30, wherein the imaging system is implemented such that constellations of points in the individual images, each superimposed by the channels of the first set of the multi-channel optics in a respective common point in the overall image, or constellations of points in the individual images, each superimposed by the channels of the second set of the multi-channel optics in a respective common point in the overall image, differ depending on what distance the respective common point in the overall image has to the multi-channel optics.

33. A method for displaying an overall image, comprising
generating individual images in a distribution of sub-areas of an imaging plane; and
mapping, by one channel of a multi-channel optics each, one allocated sub-area of the imaging plane each, such that the mapping of the individual images is superimposed to the overall image in a projection surface which is a non-planar free-form surface or tilted with respect to the imaging plane,
wherein
said generation and mapping are performed using a fixed mask fixedly forming the individual images at the sub-areas so that the projection surface is located at a fixed position relative to the projection display, with the fixed mask being configured so that the individual images are mutually distorted relative to each other
or
said generation and mapping are performed using a digital imaging system configured to reproduce versions of an input image to be displayed as the individual images, the imaging system being configured so as to mutually distort the images relative to each other in a fixed manner so that the projection surface is located at a fixed position relative to the projection display
or
said generation and mapping are performed using a digital imaging system configured to reproduce versions of an input image to be displayed as the individual images, the imaging system being configured so as to mutually distort the images relative to each other in a manner adaptive to a relative position of the projection surface relative to the projection display
and such that a manifestation of a contribution of each channel to the overall image varies locally across the overall image depending on what distance the respective common point in the overall image has to the multi-channel optics.

34. A non-transitory computer-readable medium having stored thereon a computer program comprising a program code for performing the method according to claim 27 or 33 when the program runs on a computer.

* * * * *